(12) United States Patent
Lazaro et al.

(10) Patent No.: US 12,544,338 B2
(45) Date of Patent: Feb. 10, 2026

(54) SOLID OR SEMISOLID LIPID BASED DOSAGE FORM STABILIZATION THROUGH CURING AND ADDITION OF LOW HLB SURFACTANT(S)

(71) Applicant: R.P. SCHERER TECHNOLOGIES, LLC, Carson City, NV (US)

(72) Inventors: Monica Lazaro, Tampa, FL (US); Irena McGuffy, Lutz, FL (US); Derek Bush, Belleair, FL (US); Linus Gomsi Fonkwe, Clearwater, FL (US)

(73) Assignee: R.P. SCHERER TECHNOLOGIES, LLC, Carson City, NV (US)

( * ) Notice: Subject to any disclaimer, the term of this patent is extended or adjusted under 35 U.S.C. 154(b) by 70 days.

(21) Appl. No.: 17/273,863

(22) PCT Filed: Sep. 9, 2019

(86) PCT No.: PCT/US2019/050213
§ 371 (c)(1),
(2) Date: Mar. 5, 2021

(87) PCT Pub. No.: WO2020/051585
PCT Pub. Date: Mar. 12, 2020

(65) Prior Publication Data
US 2021/0308062 A1    Oct. 7, 2021

Related U.S. Application Data

(60) Provisional application No. 62/728,359, filed on Sep. 7, 2018.

(51) Int. Cl.
*A61K 9/48* (2006.01)
*A61K 9/20* (2006.01)
*A61K 31/167* (2006.01)

(52) U.S. Cl.
CPC .......... *A61K 9/4833* (2013.01); *A61K 9/2013* (2013.01); *A61K 9/2018* (2013.01); *A61K 9/2054* (2013.01); *A61K 9/2077* (2013.01); *A61K 9/2095* (2013.01); *A61K 9/4816* (2013.01); *A61K 9/4866* (2013.01); *A61K 31/167* (2013.01)

(58) Field of Classification Search
None
See application file for complete search history.

(56) References Cited

U.S. PATENT DOCUMENTS

| | | | |
|---|---|---|---|
| 5,028,432 A * | 7/1991 | Chopra | A61K 31/341 424/456 |
| 6,306,438 B1 * | 10/2001 | Oshlack | A61P 25/02 424/468 |
| 6,652,880 B1 | 11/2003 | Aylwin et al. | |
| 8,513,311 B2 | 8/2013 | Sagalowicz et al. | |
| 9,446,008 B2 | 9/2016 | Reinhold et al. | |
| 10,413,516 B2 | 9/2019 | Allen et al. | |
| 11,464,747 B2 | 10/2022 | Wengner | |
| 2006/0034978 A1 | 2/2006 | Deem et al. | |
| 2007/0215511 A1 * | 9/2007 | Mehta | A61K 9/2013 424/481 |
| 2008/0057120 A1 | 3/2008 | Oberegger et al. | |
| 2009/0004281 A1 | 1/2009 | Nghiem et al. | |
| 2009/0047357 A1 | 2/2009 | Tomohira et al. | |
| 2009/0060983 A1 | 3/2009 | Bunick | |
| 2010/0105627 A1 | 4/2010 | Salama et al. | |
| 2011/0123610 A1 * | 5/2011 | Kshirsagar | A61K 9/2013 514/648 |
| 2011/0212926 A1 | 9/2011 | Naweed et al. | |
| 2013/0122085 A1 | 5/2013 | Dalton | |
| 2014/0271835 A1 | 9/2014 | Wengner | |
| 2015/0238457 A1 | 8/2015 | Stensrud | |
| 2015/0366967 A1 | 12/2015 | Shen et al. | |
| 2016/0095902 A1 | 4/2016 | Lichter et al. | |
| 2016/0199368 A1 | 7/2016 | Gosangari | |
| 2016/0220505 A1 | 8/2016 | Temtsin Krayz | |
| 2017/0128379 A1 | 5/2017 | Pilgaonkar et al. | |
| 2017/0312226 A1 | 11/2017 | Gumudavelli et al. | |
| 2017/0368057 A1 | 12/2017 | Saim et al. | |
| 2018/0104340 A1 | 4/2018 | Shen et al. | |

FOREIGN PATENT DOCUMENTS

| | | |
|---|---|---|
| CN | 101653414 A | 2/2010 |
| EP | 0587744 B1 | 7/2003 |
| EP | 1433478 A1 | 6/2004 |
| EP | 1433478 B1 | 11/2009 |
| JP | S61238336 A | 10/1986 |

(Continued)

OTHER PUBLICATIONS

Patel (Duloxetine HCl Lipid Nanoparticles: Preparation, Characterization, and Dosage Form Design, AAPS PharmSciTech vol. 13, pp. 125-133, (Year: 2012).*

Grond et al., "Clinical Pharmacology of Tramadol" Clin Pharmacokinet 2004;43(13):879-923 (Year: 2004).*

U.S. Department of Health and Human Services, Food and Drug Administration, Center for Drug Evaluation and Research (CDER) Dec. 2017, Biopharmaceutics, Waiver of In Vivo Bioavailability and Bioequivalence Stuides for Immediate-Release Solid Oral Dosage Forms Based on a Biopharmaceutics Classification System, Section III, part C, 19 pages, https://www.fda.gov/regulatory-information/search-fda-guidance-documents/waiver-vivo-bioavailability-and-bioequivalence-studies-immediate-release-solid-oral-dosage-forms.

(Continued)

*Primary Examiner* — Aradhana Sasan
(74) *Attorney, Agent, or Firm* — LOWENSTEIN SANDLER LLP

(57) ABSTRACT

Disclosed herein are dosage forms comprise a solid or a semisolid lipid with immediate release properties and/or with extended release properties. The dosage forms disclosed herein may have their active pharmaceutical ingredient's (API's) release profile stabilized via curing and/or via the addition of a surfactant with an HLB value of less than 10.

14 Claims, 6 Drawing Sheets

(56) References Cited

FOREIGN PATENT DOCUMENTS

| | | | |
|---|---|---|---|
| JP | H5305226 A | 11/1993 | |
| JP | 200086502 A | 3/2000 | |
| JP | 2000510487 A | 8/2000 | |
| JP | 200148809 A | 2/2001 | |
| WO | 9901111 A1 | 1/1999 | |
| WO | WO-2005020993 A1 * | 3/2005 | ............ A61K 31/00 |
| WO | 2007072908 A1 | 6/2007 | |
| WO | 2008075102 A1 | 6/2008 | |
| WO | 2009108077 A2 | 9/2009 | |
| WO | 2010112749 A1 | 10/2010 | |
| WO | 2011054046 A1 | 5/2011 | |
| WO | 2016104889 A1 | 6/2016 | |

OTHER PUBLICATIONS

International Search Report for PCT/US2019/050213 mailed Dec. 4, 2019, 2 pages.

Hallan, et al., "Lipid Polymer Hybrid as Emerging Tool in Nanocarriers for Oral Drug Delivery", Artificial Cells, Sep. 2014, 17 pages, , https://www.rsearchgate.net/publication/265860114.

Becker et al., "Solvent-Free Melting Techniques for the Preparation of Lipid-Based Solid Oral Formulations", Pharm. Res., Mar. 19, 2015, vol. 32, 27 pages.

Gupta et al., "Nanoparticle Formulation Having Ability to Control the Release of Protein for Drug Delivery Application", Materials Science and Engineering C; vol. 70, 2017, 7 pages.

Rosiaux, et al., "Solid Lipid Excipients—Matrix Agents for Sustained Drug Delivery", Journal of Controlled Release, vol. 188, 2014, 13 pages.

Djekic et al., "Development of Semisolid Self-Microemulsifying Drug Delivery Systems (SMEDDSs) Filled in Hard Capsules for Oral Delivery of Aciclovir", International Journal of Pharmaceutics, vol. 528, 2017, 9 pages.

Kumar et al., "Nonionic Surfactant Vesicular Systems for Effective Drug Delivery—An Overview", Acta Pharmaceutica Sinica B, vol. 1 (4), 2011, 12 pages.

Bnyan, et al., "Surfactant Effects on Lipid-Based Vesicles Properties", Journal of Pharmaceutical Sciences, vol. 107, Issue 4, 2018, 26 pages; http://researchonline.ljmu.ac.uk/id/eprint/7907/.

European Search Report for European Patent Application No. 19858338.7 dated May 13, 2022, 10 pages.

Krause et al., "Immediate Release Pellets with Lipid Binders Obtained by Solvent-Free Cold Extrusion", European Journal of Pharmaceutics and Biopharmaceutics, Elisevier Science Publishers, vol. 71, No. 1, Jan. 2009, pp. 138-144.

Windbergs et al., "Understanding the Solid-State Behaviour of Triglyceride Solid Lipid Extrudates and its Influence on Dissolution", European Journal of Pharmaceutics and Biopharmaceutics, Elisevier Science Publishers, vol. 71, No. 1, Jan. 2009, pp. 80-87.

Cuesov, et al, "Industrial Technology of Drugs", Ministry of Health of Ukraine, National Pharmaceutical Academy of Ukraine, vol. 2, 2002, 6 pages.

Percev et al, "Pharmaceutical and Biomedical Aspects of Drugs", Ministry of Health of Ukraine, Ukrainian Pharmaceutical Academy, vol. 1, 12 pages.

Hidaka Tooru, "Present Status and Trends of Food Emulsifiers with Special Reference to Glycerol Fatty Acid Esters", Riken Vitamin Col, Ltd., Dec. 30, 1981, 29 pages.

Knothe, et al. "A Comprehensive Evaluation of the Melting Points of Fatty Acids and Esters Determined by Differential Scanning Calorimetry", Journal of Am Oil Chemical Society, 2009, 3 pages.

Prado, et al. "Supercritical Fluid Extraction of Grape Seed: Process Scale-up, Extract Chemical Composition and Economic Evaluation", Journal of Food and Engineerying, 2012, 3 pages.

Markov, et al. "Perfection of the Processes of the Fuel Spraying and the Fuel-Air Mixture Creating in a High-Speed Diesel Engine, Working on the Bio-Fuel Mixture", SAE International, 2009, 2 pages.

Azad, et al. "Prospects, Feedstocks and Challenges of Biodiesel Production from Beauty Leaf Oil and Castor Oil: A Nonedible Oil Sources in Austrialia" Renewable and Sustainable Engergy Reviews, 2016, 2 pages.

Stamatas et al, "Lipid Uptake and Skin Occlusion Following Topical Application of Oils on Adult and Infant Skiin", Journal of Bermatological Science, 2008, 2 pages.

Estanqueiro, et al, Characterization, Sensorial Evaluation And Moisturizing Efficacy of Nanolipidgel Formulations, International Journal of Cosmetic Science, 2014, 1 page.

Tan, et al, "Influence of Geographical Origins on the Physicochemical Properties of Hass Avacado Oil", Journal of American Oil Chemical Society, 2017, 2 pages.

Marassi, et al, "Phytotherapeutic Approaches" European Handbook of Dermatological Treatments, 2015, 2 pages.

Ernie H. Unger, "Canola—Processing", Science Direct, 2011, 4 pages.

Office Action for Japanese Patent Application No. 2021512541, mailed Sep. 3, 2024, 06 Pages.

Oil Chemistry, 1981, vol. 30, No. 12, pp. 823-836, ISSN 0005092488.

Written Opinion for International Application No. PCT/US2019/050213, mailed Dec. 4, 2019, 6 Pages.

Office Action of European Patent Application No. 19858338.7, mailed Apr. 22, 2025, 07 Pages.

Krause et al., "Immediate Release Pellets with Lipid Binders Obtained by Solvent-free Cold Extrusion", European Journal of Pharmaceutics and Biopharmaceutics, vol. 71, 2009, pp. 138-144.

Muchow M. et al., "Testosterone Undecanoate Increase of Oral Bioavailability by Nanostructured Lipid Carriers (NLC)", Journal of Pharmaceutical Technology & Drug Research, 2013, pp. 1-10. Retrieved from the internet URL: https://www.researchgate.net/publication/274620328_Testosterone_undecanoate_increase_of_oral_bioavailability_by_nanostructured_lipid_carriers_NLC.

Ruiz V. C. L., "Evaluation of the Effect of a Dispersant on the Release of Ibuprofen from Lipid Matrix Tablets Based on Glyceryl Dibehenate", Faculty of Chemical and Pharmaceutical Sciences, University of Chile, Department of Pharmaceutical Sciences and Technology, 2016, pp. 1-99. Retrieved from the internet URL: https://repositorio.uchile.cl/bitstream/handle/2250/186331/Evaluacion-del-efecto-de-un-dispersante-sobre-laliberacion-de-ibuprofeno-desde-comprimidos-matriciales.pdfsequence=1&isAllowed=y.

* cited by examiner

SOLID OR SEMISOLID LIPID BASED DOSAGE FORM STABILIZATION THROUGH CURING AND ADDITION OF LOW HLB SURFACTANT(S)

CROSS-REFERENCE TO RELATED APPLICATION(S)

This application is a national phase of International Application No. PCT/US2019/050213, filed on Sep. 9, 2019, which claims the benefit of U.S. Provisional Patent Application No. 62/728,359, filed on Sep. 7, 2018. The contents of these applications are hereby incorporated by reference in their entirety.

FIELD OF THE DISCLOSURE

The present disclosure relates to the field of cured pharmaceutical compositions that comprise an active pharmaceutical ingredient dispersed in a matrix of a solid or semisolid lipid and a surfactant with an HLB value of less than 10. The present invention is also related to methods of preparing and methods of using such pharmaceutical compositions.

BACKGROUND OF THE DISCLOSURE

Solid and semisolid lipid matrices can exhibit changes in dissolution release profile over their shelf life due to changes in lipid crystal form. As a result, a drug product may have one release profile and after a year in storage, the same drug product may have a different release profile. Such variations in the release profile could be very dangerous to a subject. For instance, if the release profile slows after a year, a patient may not receive enough of the active pharmaceutical ingredient in a timely manner. Alternatively, if the release profile accelerates after a year, a patient may receive too much of the active pharmaceutical ingredient too rapidly and could overdose.

Various approaches were explored to stabilize the release profile of dosage forms comprising solid or semisolid lipid matrices. One approach explored the option of curing the dosage form by subjecting it to elevated temperature over an extended duration. Another approach explored the option of using surfactants with HLB values lower than 10 or surfactants with HLB values greater than 10 to stabilize the release profile of the active pharmaceutical ingredient in the dosage form. However, neither approach resulted in dosage forms comprising solid or semisolid lipid matrices with a stable active pharmaceutical ingredient release profile.

There is a need for a dosage form that comprises solid or semisolid lipid matrices and maintains a stable active pharmaceutical ingredient release profile over an extended duration.

OBJECTS AND SUMMARY OF THE DISCLOSURE

It is an object of certain embodiments of the present disclosure to provide a dosage form comprising a solid or a semisolid lipid matrix that maintains its active pharmaceutical ingredient's release profile over a certain period of time.

It is another object of certain embodiments of the present disclosure to provide a method for stabilizing the active pharmaceutical ingredient release profile of a dosage form comprising a solid or a semisolid lipid matrix over a certain period of time.

It is a further object of certain embodiments of the present disclosure to provide a method for preparing a dosage form comprising a solid or a semisolid lipid matrix that maintains its active pharmaceutical ingredient release profile over a certain period of time.

It is yet another object of certain embodiments of the present disclosure to prepare a dosage form that maximizes the amount of solubility enhancing and/or bioavailability enhancing materials used and minimizes the amount of non-value adding excipients, while also ensuring consistent drug product quality for the patient.

The above objects of the present disclosure and others may be achieved by the present disclosure which combines incorporation of a surfactant with an HLB value of less than 10 into a dosage form comprising a solid or a semisolid lipid and curing of the dosage form. The combination of a surfactant with an HLB value of less than 10 and curing were shown to stabilize the active pharmaceutical ingredient release profile of a dosage form comprising a solid or a semisolid lipid matrix.

In certain embodiments, the present disclosure is directed to a dosage form comprising an active pharmaceutical ingredient dispersed in a homogenous matrix of a surfactant with an HLB value of less than 10 and at least one of a solid or a semisolid lipid.

In some embodiments, the present disclosure is directed to a method for stabilizing an active pharmaceutical ingredient release profile of a dosage form. The method may comprise incorporating a surfactant with an HLB value of less than 10 and at least one of a solid or a semisolid lipid into a dosage form and curing the dosage form. The release profile of an active pharmaceutical ingredient from a dosage form stabilized according to this method after an accelerated stability study may be comparable to its release profile before an accelerated stability study (e.g., the release profile of the active pharmaceutical ingredient after an accelerated stability study may have a similarity factor (f2) no less than 50 as compared to the release profile of the active pharmaceutical ingredient before the accelerated stability study).

In some embodiments, the present disclosure is directed to a method for preparing a dosage form. In certain embodiments, the method may comprise mixing an active pharmaceutical ingredient with a surfactant with an HLB value of less than 10 and with at least one solid or semisolid lipid to form a mixture. The method may further comprise heating the mixture to melt the at least one solid or semisolid lipid to form a molten mixture. The method may further comprise forming the molten mixture into a dosage form and curing the dosage form. Forming the molten mixture into a dosage form may comprise dosing the molten mixture into a preformed blister cavity or encapsulating the molten mixture in a hardshell capsule or a softshell capsule.

In certain embodiments, the method of preparation may comprise mixing an active pharmaceutical ingredient with a surfactant with an HLB value of less than 10 and with at least one solid or semisolid lipid in an extruder. The method may further comprise extruding the active pharmaceutical ingredient, the surfactant, and the at least one solid or semisolid lipid to form a dosage form. The method may further comprise curing the dosage form.

In certain embodiments, the method of preparation may comprise dissolving an active pharmaceutical ingredient, a surfactant with an HLB value of less than 10, and the at least one of a solid or a semisolid lipid in a solvent. The method may further comprise spray drying or spray congealing the dissolved active pharmaceutical ingredient, the surfactant, and the at least one of a solid or a semisolid lipid to form a powder. The method may further comprise curing the powder.

The release profile of an active pharmaceutical ingredient of a dosage form prepared according to the methods disclosed herein after an accelerated stability study may be comparable to its release profile before an accelerated stability study (e.g., the release profile of the active pharmaceutical ingredient after an accelerated stability study may have a similarity factor (f2) no less than 50 as compared to the release profile of the active pharmaceutical ingredient before the accelerated stability study).

In some embodiments, the present disclosure is directed to a method of treatment comprising administering to a patient in need thereof a therapeutically effective amount of any of the dosage forms disclosed herein.

Definitions

As used herein, the singular forms "a," "an," and "the" include plural references unless the context clearly indicates otherwise. Thus, for example, reference to "an active pharmaceutical ingredient" includes a single active pharmaceutical ingredient as well as a mixture of two or more different active pharmaceutical ingredients, and reference to an "excipient" includes a single excipient as well as a mixture of two or more different excipients, and the like.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number ±10%, such that "about 10" would include from 9 to 11.

As used herein, the terms "active agent," "active ingredient," "active pharmaceutical ingredient," and "drug" refer to any material that is intended to produce a therapeutic, prophylactic, or other intended effect, whether or not approved by a government agency for that purpose. These terms with respect to specific agents include all pharmaceutically active agents, all pharmaceutically acceptable salts thereof, complexes, stereoisomers, crystalline forms, co-crystals, ether, esters, hydrates, solvates, and mixtures thereof, where the form is pharmaceutically active.

As used herein, the term "stereoisomers" is a general term for all isomers of individual molecules that differ only in the orientation of their atoms in space. It includes enantiomers and isomers of compounds with one or more chiral centers that are not mirror images of one another (diastereomers).

The term "enantiomer" or "enantiomeric" refers to a molecule that is nonsuperimposable on its mirror image and hence optically active wherein the enantiomer rotates the plane of polarized light in one direction by a certain degree, and its mirror image rotates the plane of polarized light by the same degree but in the opposite direction.

The term "chiral center" refers to a carbon atom to which four different groups are attached.

The term "patient" refers to a subject, an animal or a human, who has presented a clinical manifestation of a particular symptom or symptoms suggesting the need for treatment, who is treated preventatively or prophylactically for a condition, or who has been diagnosed with a condition to be treated. The term "subject" is inclusive of the definition of the term "patient" and does not exclude individuals who are otherwise healthy.

"Pharmaceutically acceptable salts" include, but are not limited to, inorganic acid salts such as hydrochloride, hydrobromide, sulfate, phosphate and the like; organic acid salts such as formate, acetate, trifluoroacetate, maleate, tartrate and the like; sulfonates such as methanesulfonate, benzenesulfonate, p-toluenesulfonate and the like; amino acid salts such as arginate, asparaginate, glutamate and the like; metal salts such as sodium salt, potassium salt, cesium salt and the like; alkaline earth metals such as calcium salt, magnesium salt and the like; and organic amine salts such as triethylamine salt, pyridine salt, picoline salt, ethanolamine salt, triethanolamine salt, dicyclohexylamine salt, N,N'-dibenzylethylenediamine salt and the like.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate certain materials and methods and does not pose a limitation on scope. No language in the specification should be construed as indicating any non-claimed element as essential to the practice of the disclosed materials and methods.

The term "condition" or "conditions" refers to those medical conditions that can be treated or prevented by administration to a subject of an effective amount of an active agent.

The terms "treatment of" and "treating" includes the lessening of the severity of or cessation of a condition or lessening the severity of or cessation of symptoms of a condition.

The terms "prevention of" and "preventing" includes the avoidance of the onset of a condition.

"Therapeutically effective amount" is intended to include an amount of an active agent, or an amount of the combination of active agents, e.g., to treat or prevent the condition, or to treat the symptoms of the condition, in a subject.

The phrase "pharmaceutically acceptable" refers to those compounds, materials, compositions, and/or dosage forms that are, within the scope of sound medical judgment, suitable for use in contact with the tissues of human beings and animals without excessive toxicity, irritation, allergic response, or other problems or complications commensurate with a reasonable benefit/risk ratio.

The term "extended release" refers to an active agent that is released over a period of time, e.g., to provide a once daily or twice daily dosage form.

The term "immediate release" refers to a dosage form that allows the drug to dissolve in the gastrointestinal tract, with no intention of delaying or prolonging the dissolution or absorption of the drug. For instance, to the release of at least 85%, at least 90%, or at least 95% of an active agent in about 5 minutes, about 15 minutes, about 30 minutes, about 45 minutes or about 60 minutes, as measured by in-vitro dissolution in a USP Apparatus 1 (#40 mesh basket), in a USP Apparatus 2 (paddle), or in a USP Apparatus 3 (reciprocating cylinder) in aqueous media (pH 1-8) at room temperature.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DETAILED DESCRIPTION

Dosage Forms

Figure 1A:
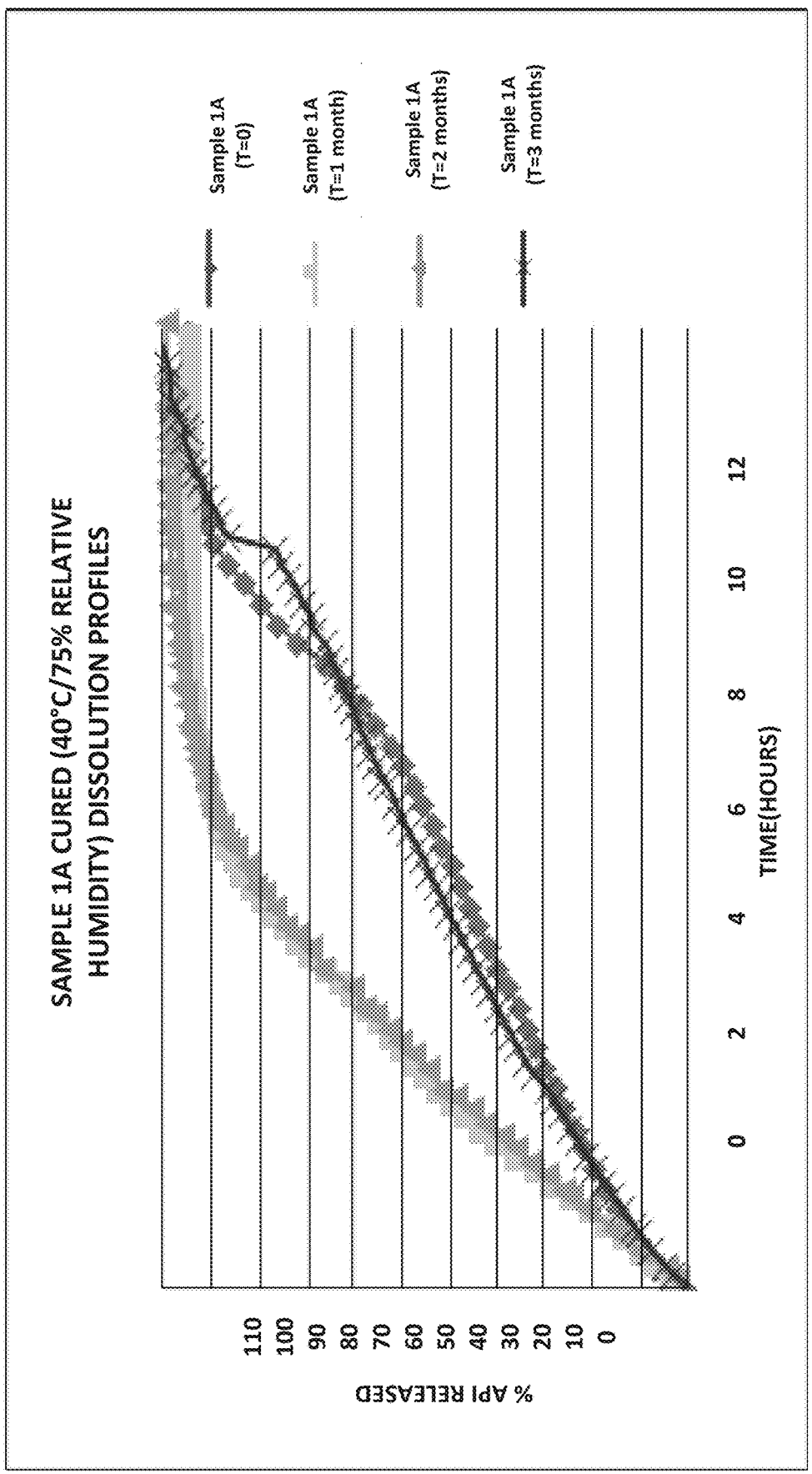
FIG. 1A depicts the dissolution profile of an uncured comparative formulation subjected to an accelerated stability study.

According to various embodiments, the present disclosure is related to a dosage form comprising an active pharmaceutical ingredient dispersed in a matrix. The matrix may comprise a surfactant and at least one of a solid or a semisolid lipid. The dosage form may be cured.

The surfactant may have an HLB value of less than 10. A surfactant with an HLB value of less than 10 may be selected, without limitations, from the group consisting of ethylene oxide/propylene oxide (EO/PO) copolymers, glycerol monocaprylate, glycerol monocaprate, glycerol caprylate/caprate, glycerol monooleate, glycerol monostearate, glycerol laurate, glycerol monolinoleate, glycerol behenate, glycerol palmitostearate, petroleum and lanolin alcohols, polyoxyethylene alkyl ethers (e.g., polyoxyl 4 lauryl ether, polyoxyl 2 cetyl ether, polyoxyl 2 stearyl ether, polyoxyl 2 oleyl ether), sorbitan fatty acid esters (e.g., sorbitan monoisostearate, sorbitan monolaurate, sorbitan monopalmitate, sorbitan monostearate, sorbitan sesquiisostearate, sorbitan sesquioleate, sorbitan sesquistearate, sorbitan diisostearate, sorbitan dioleate, sorbitan triisostearate, sorbitan trioleate, sorbitan tristearate), sucrose esters, poly(ethylene glycol)-block-poly(propylene glycol)-block-poly(ethylene glycol) (pluronic copolymers), lecithin, phospholipids, steareth-2, oleth-2, ceteth-2, PEG-30 dipolyhydroxystearate, propylene glycol monocaprylate, propylene glycol dilaurate, propylene glycol monolaurate, propylene glycol monostearate, propylene glycol isostearate, alpha tocopherol, mixed tocopherols, tricaprylin, nonionic emulsifying waxes, anionic emulsifying waxs, sorbitan monooleate, sorbitan monostearate, sorbitan monopalmitate, sorbitan tristearate, sorbitan trioleate, and combinations thereof.

The surfactant with an HLB value of less than 10 may be present in the dosage form at a concentration ranging from about 1 w/w % to about 60 w/w %, from about 1 w/w % to about 10 w/w %, from about 10 w/w % to about 30 w/w %, from about 15 w/w % to about 25 w/w %, from about 5 w/w % to about 15 w/w %, from about 25 w/w % to about 35 w/w %, from about 40 w/w % to about 50 w/w %, from about 50 w/w % to about 60 w/w %, from about 10 w/w % to about 50 w/w %, from about 20 w/w % to about 40 w/w %, or any sub-range therein, based on total weight of the dosage form.

In some embodiments, the active pharmaceutical ingredient may have a half-life of less than about 12 hours, less than about 10 hours, or less than about 8 hours. The active pharmaceutical ingredient may be present in the dosage form at a concentration ranging from 0.0001 w/w % to 90.0 w/w %, for examples, from about 0.001 w/w %, about 0.01 w/w %, about 0.1 w/w %, about 0.5 w/w %, about 1.0 w/w %, about 3.0 w/w %, about 5.0 w/w %, about 8.0 w/w %, or about 10.0 w/w % to about 15.0 w/w %, about 20.0 w/w %, about 25.0 w/w %, about 30.0 w/w %, about 35.0 w/w %, about 40.0 w/w %, about 50.0 w/w %, about 60.0 w/w %, about 70.0 w/w %, about 80.0 w/w %, or about 90.0 w/w %, based on total weight of the dosage form.

It is an object of the disclosure to encompass dosage forms with a higher concentration of the active pharmaceutical ingredient than the concentration that is currently available on the market in order to decrease the number of dosage form units a patient take or to decrease the number of times a patient takes the dosage form (for instance, if a dosage form that is currently on the market comprises about 4 mg of an active pharmaceutical ingredient for a twice daily administration, a dosage form according to the present invention may comprise about 8 mg of the active pharmaceutical ingredient for a once a day administration).

Any pharmaceutically active ingredient may be used for purposes of the present invention, including both those that are water-soluble and those that are poorly soluble in water. Suitable pharmaceutically active ingredients include, without limitation, analgesics and anti-inflammatory agents, antacids, anthelmintic, anti-arrhythmic agents, anti-bacterial agents, anti-coagulants, anti-depressants, anti-diabetics, anti-diarrheal, anti-epileptics, anti-fungal agents, anti-gout agents, anti-hypertensive agents, anti-malarial, anti-migraine agents, anti-muscarinic agents, anti-neoplastic agents and immunosuppressants, anti-protozoal agents, anti-rheumatics, anti-thyroid agents, antivirals, anxiolytics, sedatives, hypnotics and neuroleptics, beta-blockers, cardiac inotropic agents, corticosteroids, cough suppressants, cytotoxics, decongestants, diuretics, enzymes, anti-parkinsonian agents, gastro-intestinal agents, histamine receptor antagonists, lipid regulating agents, local anesthetics, neuromuscular agents, nitrates and anti-anginal agents, nutritional agents, opioid analgesics, oral vaccines, proteins, peptides and recombinant drugs, sex hormones and contraceptives, spermicides, stimulants, and combinations thereof.

In some embodiments, the active pharmaceutical ingredient may be selected, without limitations, from the group consisting of dabigatran, dronedarone, ticagrelor, iloperidone, ivacaftor, midostaurine, asimadoline, beclomethasone, apremilast, sapacitabine, linsitinib, abiraterone, vitamin D analogs (e.g., calcifediol, calcitriol, paricalcitol, doxercalciferol), COX-2 inhibitors (e.g., celecoxib, valdecoxib, rofecoxib), tacrolimus, testosterone, lubiprostone, pharmaceutically acceptable salts thereof, and combinations thereof.

In some embodiments, the lipids in the dosage form may be selected, without limitations, from the group consisting of almond oil, argan oil, avocado oil, borage seed oil, canola oil, cashew oil, castor oil, hydrogenated castor oil, cocoa butter, coconut oil, colza oil, corn oil, cottonseed oil, grape seed oil, hazelnut oil, hemp oil, hydroxylated lecithin, lecithin, linseed oil, macadamia oil, mango butter, manila oil, mongongo nut oil, olive oil, palm kernel oil, palm oil, peanut oil, pecan oil, perilla oil, pine nut oil, pistachio oil, poppy seed oil, pumpkin seed oil, rice bran oil, safflower oil, sesame oil, shea butter, soybean oil, sunflower oil, hydrogenated vegetable oil, walnut oil, and watermelon seed oil.

Other oil and fats may include, but not be limited to, fish oil (omega-3), krill oil, animal or vegetable fats, e.g., in their hydrogenated form, free fatty acids and mono-, di-, and tri-glycerides with C8-, C10-, C12-, C14-, C16-, C18-, C20- and C22-fatty acids, and combinations thereof.

According to certain embodiments, active agents may include lipid-lowering agents including, but not limited to, statins (e.g., lovastatin, simvastatin, pravastatin, fluvastatin, atorvastatin, rosuvastatin, and pitavastatin), fibrates (e.g., clofibrate, ciprofibrate, bezafibrate, fenofibrate, and gemfibrozil), niacin, bile acid sequestrants, ezetimibe, lomitapide, phytosterols, and the pharmaceutically acceptable salts, hydrates, solvates and prodrugs thereof, mixtures of any of the foregoing, and the like.

Suitable nutraceutical active agents may include, but are not limited to, 5-hydroxytryptophan, acetyl L-carnitine, alpha lipoic acid, alpha-ketoglutarates, bee products, betaine hydrochloride, bovine cartilage, caffeine, cetyl myristoleate, charcoal, chitosan, choline, chondroitin sulfate, coenzyme Q10, collagen, colostrum, creatine, cyanocobalamin (Vitamin 812), dimethylaminoethanol, fumaric acid, germanium sequioxide, glandular products, glucosamine HCl, glucosamine sulfate, hydroxyl methyl butyrate, immunoglobulin, lactic acid, L-Carnitine, liver products, malic acid, maltose-anhydrous, mannose (d-mannose), methyl sulfonyl methane, phytosterols, picolinic acid, pyruvate, red yeast extract, S-adenosylmethionine, selenium yeast, shark cartilage, theobromine, vanadyl sulfate, and yeast.

Suitable nutritional supplement active agents may include vitamins, minerals, fiber, fatty acids, amino acids, herbal supplements or a combination thereof.

Suitable vitamin active agents may include, but are not limited to, the following: ascorbic acid (Vitamin C), B vitamins, biotin, fat soluble vitamins, folic acid, hydroxycitric acid, inositol, mineral ascorbates, mixed tocopherols, niacin (Vitamin B3), orotic acid, para-aminobenzoic acid, panthothenates, panthothenic acid (Vitamin B5), pyridoxine hydrochloride (Vitamin B6), riboflavin (Vitamin B2), synthetic vitamins, thiamine (Vitamin B1), tocotrienols, vitamin A, vitamin D, vitamin E, vitamin F, vitamin K, vitamin oils and oil soluble vitamins.

Suitable herbal supplement active agents may include, but are not limited to, the following: *arnica*, bilberry, black cohosh, cat's claw, chamomile, echinacea, evening primrose oil, fenugreek, flaxseed, feverfew, garlic, ginger root, ginko biloba, ginseng, goldenrod, hawthorn, kava-kava, licorice, milk thistle, psyllium, rauowolfia, senna, soybean, St. John's wort, saw palmetto, turmeric, valerian.

Minerals active agents may include, but are not limited to, the following: boron, calcium, chelated minerals, chloride, chromium, coated minerals, cobalt, copper, dolomite, iodine, iron, magnesium, manganese, mineral premixes, mineral products, molybdenum, phosphorus, potassium, selenium, sodium, vanadium, malic acid, pyruvate, zinc and other minerals.

Examples of other possible active agents include, but are not limited to, antihistamines (e.g., ranitidine, dimenhydrinate, diphenhydramine, chlorpheniramine and dexchlorpheniramine maleate), non-steroidal anti-inflammatory agents (e.g., aspirin, celecoxib, Cox-2 inhibitors, diclofenac, benoxaprofen, flurbiprofen, fenoprofen, flubufen, indoprofen, piroprofen, carprofen, oxaprozin, pramoprofen, muroprofen, trioxaprofen, suprofen, aminoprofen, fluprofen, bucloxic acid, indomethacin, sulindac, zomepirac, tiopinac, zidometacin, acemetacin, fentiazac, clidanac, oxpinac, meclofenamic acid, flufenamic acid, niflumic acid, tolfenamic acid, diflurisal, flufenisal, piroxicam, sudoxicam, isoxicam, aceclofenac, aloxiprin, azapropazone, benorilate, bromfenac, carprofen, choline magnesium salicylate, diflunisal, etodolac, etoricoxib, faislamine, fenbufen, fenoprofen, flurbiprofen, ibuprofen, indometacin, ketoprofen, ketorolac, lornoxicam, loxoprofen, meloxicam, mefenamic acid, metamizole, methyl salicylate, magnesium salicylate, nabumetone, naproxen, nimesulide, oxyphenbutazone, parecoxib, phenylbutazone, salicyl salicylate, sulindac, sulfinpyrazone, tenoxicam, tiaprofenic acid, tolmetin, pharmaceutically acceptable salts thereof and mixtures thereof, acetaminophen, anti-emetics (e.g., metoclopramide, methylnaltrexone), anti-epileptics (e.g., phenyloin, meprobmate and nitrazepam), vasodilators (e.g., nifedipine, papaverine, diltiazem and nicardipine), anti-tussive agents and expectorants (e.g. codeine phosphate), anti-asthmatics (e.g. theophylline), antacids, anti-spasmodics (e.g. atropine, scopolamine), antidiabetics (e.g., insulin), diuretics (e.g., ethacrynic acid, bendrofluthiazide), anti-hypotensives (e.g., propranolol, clonidine), antihypertensives (e.g., clonidine, methyldopa), bronchodilatiors (e.g., albuterol), steroids (e.g., hydrocortisone, triamcinolone, prednisone), antibiotics (e.g., tetracycline), antihemorrhoidals, hypnotics, psychotropics, antidiarrheals, mucolytics, sedatives, decongestants (e.g. pseudoephedrine), laxatives, vitamins, stimulants (including appetite suppressants such as phenylpropanolamine) and cannabinoids, as well as pharmaceutically acceptable salts, hydrates, solvates, and prodrugs thereof.

The active agent that may also be a benzodiazepine, barbiturate, stimulants, or mixtures thereof. The term "benzodiazepines" refers to a benzodiazepine and drugs that are derivatives of a benzodiazepine that are able to depress the central nervous system. Benzodiazepines include, but are not limited to, alprazolam, bromazepam, chlordiazepoxide, clorazepate, diazepam, estazolam, flurazepam, halazepam, ketazolam, lorazepam, nitrazepam, oxazepam, prazepam, quazepam, temazepam, triazolam, methylphenidate as well as pharmaceutically acceptable salts, hydrates, solvates, prodrugs and mixtures thereof. Benzodiazepine antagonists that can be used as active agent include, but are not limited to, flumazenil as well as pharmaceutically acceptable salts, hydrates, solvates and mixtures thereof.

The term "barbiturates" refers to sedative-hypnotic drugs derived from barbituric acid (2, 4, 6,-trioxohexahydropyrimidine). Barbiturates include, but are not limited to, amobarbital, aprobarbotal, butabarbital, butalbital, methohexital, mephobarbital, metharbital, pentobarbital, phenobarbital, secobarbital as well as pharmaceutically acceptable salts, hydrates, solvates, prodrugs, and mixtures thereof. Barbiturate antagonists that can be used as active agent include, but are not limited to, amphetamines as well as pharmaceutically acceptable salts, hydrates, solvates and mixtures thereof.

The term "stimulants" includes, but is not limited to, amphetamines such as dextroamphetamine resin complex, dextroamphetamine, methamphetamine, methylphenidate, as well as pharmaceutically acceptable salts, hydrates, and solvates and mixtures thereof. Stimulant antagonists that can be used as active agent include, but are not limited to, benzodiazepines, as well as pharmaceutically acceptable salts, hydrates, solvates and mixtures thereof.

The dosage forms according to the disclosure include various active agents and their pharmaceutically acceptable salts thereof. Pharmaceutically acceptable salts include, but are not limited to, inorganic acid salts such as hydrochloride, hydrobromide, sulfate, phosphate and the like; organic acid salts such as formate, acetate, trifluoroacetate, maleate, tartrate and the like; sulfonates such as methanesulfonate, benzenesulfonate, p-toluenesulfonate, and the like; amino acid salts such as arginate, asparginate, glutamate and the like, and metal salts such as sodium salt, potassium salt, cesium salt and the like; alkaline earth metals such as calcium salt, magnesium salt and the like; organic amine salts such as triethylamine salt, pyridine salt, picoline salt, ethanolamine salt, triethanolamine salt, dicyclohexylamine salt, N,N'-dibenzylethylenediamine salt and the like.

The dosage form may be stored at elevated temperatures and/or elevated humidity and may still maintain a consistent active pharmaceutical ingredient release profile over time. The dosage form may be appropriate for pediatric use in certain embodiments. The dosage form may be in a form suitable for administration via an oral route, sublingual route, buccal route, vaginal route, or rectal route. In certain embodiments, the dosage form may be suitable for administration via the oral route and may be chewable.

In some embodiments, the final dosage form may have a shape selected from, without limitations, the group consisting of round, oval, oblong, capsule, tube, and teardrop. In some embodiments, the final dosage form has a single compartment. In other embodiments, the final dosage form has multiple compartments (also referred to as chambers). For instance, the final dosage form may have two, three, four, or more chambers.

In some embodiments, the dosage form may further comprise fillers and/or excipients. The fillers and/or excipients may independently or cumulatively be present in the dosage form at a concentration of about 20 w/w % or less, about 15 w/w % or less, about 10 w/w % or less, about 5 w/w % or less, about 4 w/w % or less, about 3 w/w % or less, about 2 w/w % or less, about 1 w/w % or less, about 0.5 w/w % or less, about 0.1 w/w % or less, based on the total weight of the dosage form. In some embodiments, the dosage form may have no fillers (e.g., 0 w/w %). In some embodiments, the dosage form may have no excipients (e.g., 0 w/w %). In some embodiments, the dosage form may comprise fillers and/or excipients in an amount ranging, e.g., from about 2 w/w % to about 50 w/w %, from about 6 w/w % to about 40 w/w %, from about 10 w/w % to about 30 w/w %, from about 10 w/w % to about 40 w/w %, from about 15 w/w % to about 35 w/w %, from about 20 w/w % to about 30 w/w %, from about 20 w/w % to about 25 w/w %, or from about 15 w/w % to about 25 w/w %, individually or collectively, based on the total weight of the dosage form.

Exemplary fillers may be selected, without limitations, from the group consisting of lactose, microcrystalline cellulose, and combinations thereof.

Exemplary excipients may be selected, without limitations, from the group consisting of fats with high melting point (e.g., triglycerides with a melting point greater than 25° C.), waxes, oils with low melting point (e.g., triglycerides with a melting point below 25° C.), liquid lipids, surfactants with HLB values greater than 10, solvents, cosolvents, solid high molecular weight polyethylene glycol, liquid polyethylene glycol, lubricants, pore formers, dispersing agents, gelatin, gums, water-soluble polymers, water, glycerin, sorbitol, cyclodextrins, flavoring agents, disintegrants, and combinations thereof. In some embodiments, the dosage form may comprise additional excipients such as solubility enhancers, solubilizers (e.g., caprylocaproyl polyoxyl-8 glycerides, and polyethylene glycol monostearate), bioavailability enhancers, plasticizers, colorants, opacifying agents, fragrances, enzymes, sweeteners, spices, vitamins, preservatives, stabilizers, antioxidants, release agents (e.g., lipid matrix for extended release such as glyceryl distearate), extenders, cross-linking agents, anti-blocking agents, detackifying agents, diluents, antifoams, buffering agents, blowing agents, bulking agents, adjuvants, flow accelerators, mold release agents, granulating agents, binders, oils/fats, pH modifiers, absorbents, glidants (e.g., silicon dioxide), adhesives, anti-adherents (e.g, talc, cornstarch, colloidal silicone dioxide (Cab-O-Sil™), DL-Leucine, sodium lauryl sulfate, and metallic stearates), acidulants, softeners, resins, demulcents, emulsifiers, osmotic agents, elastomers, bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), combinations thereof, and other functional ingredients, in amounts suitable for their intended purposes. Suitable excipients may be in a liquid, semi-solid, and/or solid form.

Exemplary solvents and/or cosolvents may be selected, without limitations, from the group consisting of ethanol, propylene glycol, glycerin, polyethylene glycol, and combinations thereof.

Exemplary solid high molecular weight polyethylene glycol may be selected, without limitations, from the group consisting of PEG 3350, PEG 4000, PEG 4600, PEG 5000, PEG 6000, PEG 7000, PEG 8000, PEG of up to 10000, and combinations thereof.

Exemplary liquid polyethylene glycol may be selected, without limitations, from the group consisting of PEG 200, PEG 300, PEG 400, PEG 600, PEG 800, PEG 1000, PEG 2000, and combinations thereof.

Exemplary water-soluble polymers may be selected, without limitations, from the group consisting of hydroxypropylmethylcellulose (HPMC), hydroxypropylcellulose (HPC), hydroxyethylcellulose (HEC), gums, and combinations thereof.

Exemplary disintegrants may be selected, without limitations, from the group consisting of cross-carmellose, pregelatin, starch, sodium stearyl fumarates, and combinations thereof.

Plasticizers

Exemplary plasticizers that may be in the dosage form may include, but not be limited to, sugar alcohol plasticizer such as isomalt, maltitol, sorbitol, xylitol, erythritol, adonitol, dulcitol, pentaerythritol, or mannitol; or polyol plasticizer such as glycerin, diglycerin, ethylene glycol, diethylene glycol, triethyleneglycol, tetraethylene glycol, dipropylene glycol, a polyethylene glycol up to 10,000 MW, neopentyl glycol, propylene glycol, 1,3-propanediol, 2-methyl-1,3-propanediol, trimethylolpropane, a polyether polyol, ethanol amines; and mixtures thereof. Other exemplary plasticizers may include, without limitations, low molecular weight polymers, oligomers, copolymers, oils, small organic molecules, low molecular weight polyols having aliphatic hydroxyls, ester-type plasticizers, glycol ethers, poly(propylene glycol), multi-block polymers, single block polymers, citrate ester-type plasticizers, and triacetin. Such plasticizers may include 1,2-butylene glycol, 2,3-butylene glycol, styrene glycol, monopropylene glycol monoisopropyl ether, propylene glycol monoethyl ether, ethylene glycol monoethyl ether, diethylene glycol monoethyl ether, sorbitol lactate, ethyl lactate, butyl lactate, ethyl glycolate, dibutyl sebacate, acetyltributylcitrate, triethyl citrate, glyceryl monostearate, polysorbate 80, acetyl triethyl citrate, tributyl citrate and allyl glycolate, and mixtures thereof.

Colorants

Colorants may also be referred to herein as "dye or pigment" or as a "coloring agent." Colorants refer to a substance that imparts coloring and/or aesthetic appearance to the dosage form. A dye is a colored substance that has an affinity to the substrate to which it is being applied. The dye may be applied in an aqueous solution, and requires a mordant to improve the fastness of the dye on the substrate. A pigment is a material that changes the color of reflected or transmitted light as the result of wavelength-selective absorption. This physical process differs from fluorescence, phosphorescence, and other forms of luminescence, in which a material emits light. Both dyes and pigments appear to be colored because they absorb some wavelengths of light more than others. In contrast with a dye, a pigment generally is insoluble, and has no affinity for the substrate.

Exemplary colorants that may be in the dosage form may include, but not be limited to, colors such as e.g., white, black, yellow, blue, green, pink, red, orange, violet, indigo, and brown. In specific embodiments, the color of the dosage form can indicate the contents (e.g., one or more active ingredients) contained therein.

Flavoring Agents

"Flavoring agent" refers to a substance capable of providing a flavor. In addition to providing a palatable and pleasurable factor to the user, the flavoring agent can also mask undesirable flavors present in the dosage form. The flavoring agent can include natural flavoring agents (e.g., extracts).

"Flavor extract" refers to a flavoring agent obtained by extracting a part of a raw material, e.g., animal or plant material, often by using a solvent such as ethanol or water. The majority of natural essences are obtained by extracting the essential oil from the blossoms, fruit, roots, etc., or the whole plants, through four techniques: expression (when the oil is very plentiful and easily obtained, as in lemon peel), absorption (generally accomplished by steeping in alcohol, as vanilla beans), maceration (used to create smaller bits of the whole, as in making peppermint extract, etc.), and distillation (used with maceration, but in many cases, it requires expert chemical knowledge and the erection of costly stills).

Exemplary flavoring agents that may be in the dosage form may include, but not be limited to, breath freshening compounds like menthol, spearmint, and cinnamon, coffee beans, other flavors or fragrances such as fruit flavors (e.g., cherry, orange, grape, etc.), especially those used for oral hygiene, as well as actives used in dental and oral cleansing such as quaternary ammonium bases. The effect of flavors may be enhanced using flavor enhancers like tartaric acid, citric acid, vanillin, or the like.

Fragrances

Exemplary fragrances that may be in the dosage form include, but are not limited to, natural and/or synthetic fragrance raw materials. For instance, oil soluble perfume oils, which may or may not be in mixture with water soluble perfume oils. Oil soluble perfume materials are natural, or natural-identical essential oils such as orange oil, lavender oil, pine oil, *eucalyptus* oil, lemon oil, clove leaf, peppermint oil, cedarwood oil, rosemary oil, bergamot oil, lavandin oil, patchouli oil, chamomile oil, jasmine oil, spike oil, rose oil, Vetiver oil, fennel oil, anise oil, thyme oil, germanium oil, menthol, and marjoram oil. An animal fragrance is for example musk, castoreum, aber or zibet. Spagyric essences are also known in the art. They are made by fermenting certain herbs that are then processed to the final product. Synthetic fragrance ingredients are for example synthetic essential oils such as composed of single compounds such as linalol, terpineol, nerol, citronellal, benzaldehyde, cinnamon aldehyde, vanillin, ethylvanillin, or methylacetophenone. The fragrance materials may also be synthetic oil soluble perfume oils selected from the usual group consisting of fragrant hydrocarbons, alcohols, ketones, aldehydes, ethers, esters, polyene derivatives. Other fragrances that may be used are catalogued and described in references and databases such as S. Arctander, Perfume and Flavor Chemicals, Volumes I and II (1960, 1969; reprint 2000); Allured's Flavor and Fragrance Materials (2005); and database maintained by the Research Institute for Fragrance Materials at www.rifm.org.

Sweeteners

The term "sweetener" refers to a substance capable of providing a palatable and pleasurable factor to the user, and/or capable of masking undesirable flavors present in the dosage form. Exemplary sweeteners that may be in the dosage form may include, but not be limited to, one or more artificial sweeteners, one or more natural sweeteners, or a combination thereof. Artificial sweeteners include, e.g., acesulfame and its various salts such as the potassium salt (available as Sunett®), alitame, aspartame (available as NutraSweet® and Equal®), salt of aspartame-acesulfame (available as Twinsweet®), neohesperidin dihydrochalcone, naringin dihydrochalcone, dihydrochalcone compounds, neotame, sodium cyclamate, saccharin and its various salts such as the sodium salt (available as Sweet'N Low®), stevia, chloro derivatives of sucrose such as sucralose (available as Kaltame® and Splenda®), and mogrosides. Natural sweeteners include, e.g., glucose, dextrose, invert sugar, fructose, sucrose, glycyrrhizin; monoammonium glycyrrhizinate (sold under the trade name MagnaSweet®); *Stevia rebaudiana* (Stevioside), natural intensive sweeteners, such as Lo Han Kuo, polyols such as sorbitol, mannitol, xylitol, erythritol, and the like.

Vitamins

As used herein, the term "vitamin" refers to an organic compound required by an organism as a vital nutrient in limited amounts. An organic chemical compound (or related set of compounds) is called a vitamin when it cannot be synthesized in sufficient quantities by an organism, and must be obtained from the diet. Thus, the term is conditional both on the circumstances and on the particular organism. For example, ascorbic acid (Vitamin C) is a vitamin for humans, but not for most other animals, and biotin and vitamin D are required in the human diet only in certain circumstances.

Exemplary human vitamins that may be in the dosage form may include, but not be limited to, Vitamin A (e.g., retinol, retinal, and four carotenoids including beta carotene), Vitamin B1 (thiamine), Vitamin B2 (riboflavin), Vitamin B3 (e.g., niacin and niacinamide), Vitamin B5 (pantothenic acid), Vitamin B6 (e.g., pyridoxine, pyridoxamine, and pyridoxal), Vitamin B7 (biotin), Vitamin B9 (e.g., folic acid and folinic acid), Vitamin B12 (e.g., cyanocobalamin, hydroxocobalamin, and methylcobalamin), Vitamin C (ascorbic acid), Vitamin D (cholecalciferol), Vitamin E (e.g., tocopherols and tocotrienols), and Vitamin K (e.g., phylloquinone, phytonadione, and menaquinones).

Preservatives

The term "preservative", as used herein, refers to an agent that extends the storage life of the dosage form by retarding or preventing deterioration of flavor, odor, color, texture, appearance, therapeutic value, or safety. A preservative need not provide a lethal, irreversible action resulting in partial or complete microbial cell destruction or incapacitation. Sterilants, sanitizers, disinfectants, sporicides, viracides and tuberculocidal agents provide such an irreversible mode of action, sometimes referred to as "bactericidal" action. In contrast, a preservative can provide an inhibitory or bacteriostatic action that is reversible, in that the target microbes can resume multiplication if the preservative is removed. The principal differences between a preservative and a sanitizer primarily involve mode of action (a preservative prevents growth rather than killing microorganisms) and exposure time (a preservative has days to months to act whereas a sanitizer has at most a few minutes to act).

Antioxidants

Exemplary antioxidants that may be in the dosage form may include, but not be limited to, sterically hindered phenols, aryl amines, thioureas, thiocarbamates, phosphites, thioether esters, and combinations of the foregoing. Other suitable examples of antioxidants include, but are not limited to, alkylated monophenols, including but not limited to, 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-di-cyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1-yl)phenol and mixtures thereof, alkylthiomethylphenols, including but not limited to, 2,4-dioctylthiornethyl-6-tert-hutylphenol, 2,4-dioctylthiomethyl-6-methylphenol, 2,4-dioetylthiomethyl-6-ethylphenol, 2,6-di-dodecylthiornethyl-4-nonylphenol, hydroquinones and alkylated hydroquinones, including but not limited to, 2,6-di-tert-hutyl-4-methoxyphenol, 2,5-di-tert-butylhydroquinone, 2,5-di-tort-amylhydroquinone, 2,6-di-phenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate, tocopherols, including but not limited to, α-tocopherol, β-tocopherol, Y-tocopherol, 8-tocopherol and mixtures thereof (vitamin E), hydroxylated thiodiphenyl ethers, including but not limited to, 2,2'-thiobis(6-tort-butyl-4-methylphenol), 2,2'-thiobis(4-oetylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis (2,6-dimethyl-4-hydroxyphenyl)-disulfide, alkylidenebisphenols, including but not limited to, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis (4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-test-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3, 5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,5, 5-tetra-(5-tert-butyl-4-hydroxy-2-methylphenyl)pentane, O-, N- and S-benzyl compounds, including but not limited to, 3,5,3',5'-tetra-tert-butyl.-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate, hydroxybenzylated malonates, including but not limited to, dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate, aromatic hydroxybenzyl compounds, including but not limited to, 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, triazine compounds, including but not limited to, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)iso-cyanurate, benzylphosphonates, including but not limited to, dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid, acylaminophenols, including but not limited to, 4-hydroxylauranilide, 4-hydroxystearanilide, octyl N-(3,5-di-tert-butyl-4-hydroxyphenyl)carbamate, esters of β-(3,5-di-tert-butyl-4-hydroxyphenyl)propionic acid with mono- or polyhydric alcohols, e.g. with methanol, ethanol n-octanol, i-octanol, octadecanol, 1,6-hexanediol, 1,9-nonanediol, ethylene glycol, 1,2-propanediol, neopentyl glycol, thiodiethylene glycol, triethylene diethylene glycol, glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane, esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1, 1-dimethylethyl]-2,4,8,10-tetraoxaspiro[5.5]-undecane, esters of 6-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycal, thiodiethyl.ene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, amides of 6-(3,5-di-tert-butyl-4-hydroxyphenyl)propionic acid e.g. N,N'-bis(3,5-di-tert-butylA-hydroxyphenylpropionyl) hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy) ethyl]oxamide (Naugard®XL-1, supplied by Uniroyal), ascorbic acid (vitamin C), aminic antioxidants, including but not limited to, N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenyienediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, including but not limited to, p,p'-di-tert-octyldiphenylamine, 4-n-butylaminophenol, 4-butyrylaminophenol, 4-nonanoylaminophenol, 4-dodecanoylaminophenol, 4-bis(4-methoxyphenyl)amine 2,6-di-tert-butyl-4-octadecanoylaminophenol, dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated teak-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene, and combinations of the foregoing.

Lubricants/Release Agents

Suitable lubricants/release agents for the dosage form can include, but are not limited to, fatty acids and their salts, fatty alcohols, fatty esters, fatty amines, fatty amine acetates and fatty amides. Other suitable lubricants may include, but not be limited to, glyceryl behenate (Compritol™ 888), metallic stearates (e.g., magnesium, calcium and sodium stearates), stearic acid, hydrogenated vegetable oils (e.g., Sterotex™), talc, waxes such as beeswax and carnauba wax, silica, fumed silica, colloidal silica, calcium stearate, long chain fatty alcohols, boric acid, sodium benzoate and sodium acetate, sodium chloride, DL-Leucine, polyethylene glycols (e.g., Carbowax™ 4000 and Carbowax™ 6000), sodium oleate, sodium benzoate, sodium acetate, sodium lauryl sulfate, sodium stearyl fumarate (Pruv™), magnesium lauryl sulfate, stearic acid, stearyl alcohol, mineral oil, paraffin, micro crystalline cellulose, glycerin, propylene glycol and combinations thereof.

Extenders/Antiblocking Agents/Detackifying Agents

Suitable extenders/antiblocking agents/detackifying agents for the dosage form can include, but are not limited to, starches, modified starches, crosslinked polyvinylpyrrolidone, crosslinked cellulose, microcrystalline cellulose, silica, metallic oxides, calcium carbonate, talc and mica.

Diluents

Suitable diluents useful in the dosage forms according to the disclosure include, but are not limited to, lactose USP, lactose USP (anhydrous), lactose USP (spray dried), starch USP, directly compressible starch, mannitol USP, sorbitol, dextrose monohydrate, microcrystalline cellulose NF, dibasic calcium phosphate dihydrate NF, sucrose-based diluents, confectioner's sugar, monobasic calcium sulfate monohydrate, calcium sulfate dihydrate NF, calcium lactate trihydrate granular NF, dextrates NF (e.g., Emdex™), dextrose (e.g., Cerelose™), inositol, hydrolyzed cereal solids such as the Maltrons™ and Mor-Rex™, amylose, powdered cellulose (e.g., Elcema™), calcium carbonate, glycine, bentonite, polyvinylpyrrolidone, and the like.

Oils/Fats

Exemplary oils and fats that may be in the dosage form may include, but not be limited to, almond oil, argan oil, avocado oil, canola oil, cashew oil, castor oil, cocoa butter, coconut oil, colza oil, corn oil, cottonseed oil, grape seed oil, hazelnut oil, hemp oil, hydroxylated lecithin, lecithin, linseed oil, macadamia oil, mango butter, manila oil, mongongo nut oil, olive oil, palm kernel oil, palm oil, peanut oil, pecan oil, perilla oil, pine nut oil, pistachio oil, poppy seed oil, pumpkin seed oil, rice bran oil, safflower oil, sesame oil, shea butter, soybean oil, sunflower oil, walnut oil, and watermelon seed oil. Other oil and fats that may be in the fill of the PVA shell may include, but not be limited to, fish oil (omega-3), crill oil, animal or vegetable fats, e.g., in their hydrogenated form, mono-, di-, and tri-glycerides with C12-, C14-, C16-, C18-, C20- and C22-fatty acids.

pH Modifiers

Exemplary pH modifiers that may be in the dosage form may include, but not be limited to, hydrochloric acid, potassium hydroxide, sodium hydroxide, ammonium hydroxide, sulfuric acid, phosphoric acid, and nitric acid.

Other Excipients

Other exemplary excipients that may be in the dosage form may include, but not be limited to, gelatin, vegetable proteins such as sunflower protein, soybean proteins, cotton seed proteins, peanut proteins, grape seed proteins, whey proteins, whey protein isolates, blood proteins, egg proteins, acrylated proteins, water-soluble polysaccharides such as alginates, carrageenans, guar gum, agar-agar, xanthan gum, gellan gum, gum arabic and related gums (gum ghatti, gum karaya, gum tragancanth), pectin, water-soluble derivatives of cellulose: alkylcelluloses hydroxyalkylcelluloses and hydroxyalkylalkylcelluloses, such as methylcelulose, hydroxymethylcellulose, hydroxyethylcellulose, hydroxypropylcellulose, hydroxyethylmethylcellulose, hydroxypropylmethylcellulose, hydroxybutylmethylcellulose, cellulose esters and hydroxyalkylcellulose esters such as cellulose acetate phthalate (CAP), hydroxypropylmethylcellulose (HPMC); carboxyalkylcelluloses, carboxyalkylalkylcelluloses, carboxyalkylcellulose esters such as carboxymethylcellulose and their alkali metal salts; water-soluble synthetic polymers such as polyacrylic acids, polyacrylamides, and polyacrylic acid esters, polymethacrylic acids, polymethacrylamides, and polymethacrylic acid esters, polyvinylacetates, polyvinylalcohols, polyvinylacetatephthalates (PVAP), polyvinylpyrrolidone (PVP), PVY/vinyl acetate copolymer, and polycrotonic acids; also suitable are phthalated gelatin, gelatin succinate, crosslinked gelatin, shellac, water-soluble chemical derivatives of starch, cationically modified acrylates and methacrylates possessing, for example, a tertiary or quaternary amino group, such as the diethylaminoethyl group, which may be quaternized if desired; and other similar polymers; inorganic fillers, such as the oxides of magnesium aluminum, silicon, titanium, etc.

Other pharmaceutically acceptable excipients that may be used in the dosage form may include, without limitations, a hydrophobic material, including, but is not limited to, digestible, long chain (C8-C50, especially C12-C40), substituted or unsubstituted hydrocarbons, such as natural or synthetic waxes (such as beeswax, glycowax, castor wax and carnauba wax), fatty alcohols (such as lauryl, myristyl, stearyl, cetyl or preferably cetostearyl alcohol), fatty acids, including, but not limited to, mono-diglyceride of medium chain fatty acids (such as caprylic, capric, caproic, lauric, oleic, linoleic), medium chain triglycerides, fatty acid esters, fatty acid glycerides (mono-, di-, and tri-glycerides), hydrogenated fats, hydrocarbons, normal waxes, stearic acid, stearyl alcohol and hydrophobic and hydrophilic materials having hydrocarbon backbones.

Additional pharmaceutically acceptable excipients may further include polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, acetic acid, caprylic acid, oleic acid, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), methacrylic acid/methyl methacrylate, methacrylic acid/ethyl acrylate copolymers, methacrylic acid/methyl acrylate/methyl methacrylate copolymers, shellac, hydroxypropyl methylcellulose phthalate, hydroxyl propyl methyl cellulose acetate succinate, hydroxypropyl methyl cellulose trimellitate, cellulose acetate phthalates, polyvinyl acetate phthalates, PEG-35 castor oil, caprylocaproyl polyoxyl-8 glycerides, glyceryl distearate, and combinations thereof.

Surfactants with an HLB Value Greater than 10

Suitable high HLB surfactants may include, without limitations polysorbate 80-polyoxyethylene (20) sorbitan monooleate, polyoxyl 40 hydrogenated castor oil, polyoxyl 35 castor oil, caprylocaproyl macrogol glycerides, and combinations thereof.

Release Rate

The dosage forms disclosed herein may exhibit an immediate release profile.

In certain embodiments, the dosage forms disclosed herein release at least about 80%, at least about 85%, at least about 90%, at least about 95%, or at least about 98% of the active agent within 15 minutes as measured by in-vitro dissolution in a USP Apparatus 1 (#40 mesh basket), in a USP Apparatus 2 (paddle), or in a USP Apparatus 3 (reciprocating cylinder) in aqueous media (at a pH ranging from about 1 to about 8) at about 37° C.

In certain embodiments, the dosage forms disclosed herein release at least about 80%, at least about 85%, at least about 90%, at least about 95%, or at least about 98% of the active agent within 30 minutes as measured by in-vitro dissolution in a USP Apparatus 1 (#40 mesh basket), in a USP Apparatus 2 (paddle), or in a USP Apparatus 3 (reciprocating cylinder) in aqueous media (at a pH ranging from about 1 to about 8) at 37° C.

In certain embodiments, the dosage forms disclosed herein release at least about 80%, at least about 85%, at least about 90%, at least about 95%, or at least about 98% of the active agent within 45 minutes as measured by in-vitro dissolution in a USP Apparatus 1 (#40 mesh basket), in a USP Apparatus 2 (paddle), or in a USP Apparatus 3 (reciprocating cylinder) in aqueous media (at a pH ranging from about 1 to about 8) at 37° C.

In certain embodiments, the dosage forms disclosed herein release at least about 80%, at least about 85%, at least about 90%, at least about 95%, or at least about 98% of the active agent within 60 minutes as measured by in-vitro dissolution in a USP Apparatus 1 (#40 mesh basket), in a USP Apparatus 2 (paddle), or in a USP Apparatus 3 (reciprocating cylinder) in aqueous media (at a pH ranging from about 1 to about 8) at room temperature.

The dosage forms disclosed herein may exhibit an extended release profile.

In certain embodiments, the dosage form disclosed herein may release about 10 wt % to about 30 wt % of active agent at 1 hours, about 25 wt % to about 50 wt % of active agent at 2 hours, about 40 wt % to about 80 wt % of active agent at 4 hours, about 65 wt % to about 95 wt % of active agent at 8 hours, from about 80 wt % to about 100 wt % at 12 hours, and greater than 90 wt % of active agent at 24 hours, in each case, as measured by an in-vitro dissolution in a USP Apparatus 1 (basket) at 100 rpm, in a USP Apparatus 2 (paddle) at 50 rpm, 75 rpm, or 100 rpm, or in a USP Apparatus 3 (reciprocating cylinder) in aqueous media (at a pH 1-8) at 37° C.

In certain embodiments, the dosage form disclosed herein may release about 15 wt % to about 25 wt % of active agent at 1 hours, about 30 wt % to about 40 wt % of active agent at 2 hours, about 55 wt % to about 75 wt % of active agent at 4 hours, about 75 wt % to about 85 wt % of active agent at 8 hours, from about 90 wt % to about 100 wt % at 12 hours, and greater than 95 wt % of active agent at 24 hours, in each case, as measured by an in-vitro dissolution in a USP Apparatus 1 (basket) at 100 rpm, in a USP Apparatus 2 (paddle) at 50 rpm, 75 rpm, or 100 rpm, or in a USP Apparatus 3 (reciprocating cylinder) in aqueous media (at a pH 1-8) at 37° C.

In certain embodiments, the release profile of the active pharmaceutical ingredient from the dosage form after an accelerated stability study is comparable to its release profile before the accelerated stability study. In some embodiments, the release profile of the active pharmaceutical ingredient from the dosage form after an accelerated stability study may have a similarity factor (f2) no less than about 50 (e.g., from about 50, about 55, about 60, about 65, about 70, or about 75 to about 80, about 85, about 90, about 95, or about 100), as compared to the release profile of the active pharmaceutical ingredient from the dosage form before the accelerated stability study. The term "comparable" or "similarity factor (f2)" may be used herein interchangeably and mean that the release profile of the active pharmaceutical ingredient after an accelerated stability study is considered to be similar or bioequivalent if the f2 value is no less than about 50, compared to the release profile of the active pharmaceutical ingredient before the accelerated stability study.

The similarity factor (f2) may be used when comparing the dissolution profiles of test and reference products. Similarity factor (f2) may be calculated based on the following equation:

$$f_2 = 50 \cdot \log\left\{\left[1 + \left(\frac{1}{n}\right)\sum_{t=1}^{n}(R_t - T_t)^2\right]^{-0.5} \cdot 100\right\}$$

where n is number of time points, Rt is the dissolution value of the reference batch at time t, and Tt is the dissolution value of the test batch at time t, as indicated in the FDA Guidance to Industry issued in December 2017 regarding bioequivalence studies for solid oral dosage forms (https://www.fda.gov/regulatory-information/search-fda-guidance-documents/waiver-vivo-bioavailability-and-bioequivalence-studies-immediate-release-solid-oral-dosage-forms, section III, part C, incorporated herein by reference).

The accelerated stability study according to embodiments herein may be performed for about 2 days, about 5 days, about 7 days, about 14 days, about 21 days, about 28 days, about 56 days, about 84 days, about 112 days, about 140 days, about 168 days, about 365 days, about 1 month, about 2 months, about 3 months, about 6 months, about 12 months, from about 2 days to about 12 months, from about 7 days to about 12 months, from about 1 month to about 12 months, from about 1 month to about 6 months, or from about 1 month to about 3 months. In an embodiment, the accelerated stability study may be performed for at least about one month. In an embodiment, the accelerated stability study may be performed for at least about two months. In an embodiment, the accelerated stability study may be performed for at least about three months.

The accelerated stability study according to embodiments herein may be performed at a temperature ranging from about 25° C. to about 40° C. and at a humidity ranging from about 60% to about 75%. In certain embodiments, the accelerated stability study may be performed at a temperature of about 40° C. and a relative humidity of about 75%.

In one embodiment, the similarity factor (f2) between the release profile of the API from a dosage form according to an embodiment after an accelerated stability study at 40° C. and 75% relative humidity for about one month and its release profile before the accelerated stability study ranges from about 50 to about 70, from about 55 to about 65, or from about 58 to about 62.

In one embodiment, the similarity factor (f2) between the release profile of the API from a dosage form according to an embodiment after an accelerated stability study at 40° C. and 75% relative humidity for about two months and its release profile before the accelerated stability study ranges from about 50 to about 70, from about 53 to about 68, or from about 55 to about 66.

In one embodiment, the similarity factor (f2) between the release profile of the API from a dosage form according to an embodiment after an accelerated stability study at 40° C. and 75% relative humidity for about three months and its release profile before the accelerated stability study ranges from about 50 to about 95, from about 51 to about 60, from about 52 to about 55, from about 85 to about 95, or from about 88 to about 92.

The release/dissolution profile of an active pharmaceutical ingredient (API) from a dosage form may be measured in accordance with FDA guidance of December 2017 (https://www.fda.gov/regulatory-information/search-fda-guidance-documents/waiver-vivo-bioavailability-and-bioequivalence-studies-immediate-release-solid-oral-dosage-forms), incorporated herein by reference. Specifically, the release/dissolution profile of an API may be measured by an in-vitro dissolution in a USP Apparatus 1 (basket) at 100 rpm, in a USP Apparatus 2 (paddle) at 50 rpm, 75 rpm, or 100 rpm, or in a USP Apparatus 3 (reciprocating cylinder) in aqueous media (at a pH 1-8) at 37° C. using 500 mL (or 900 mL with appropriate justification) of the following dissolution media: (1) 0.1 N HCl or Simulated Gastric Fluid (SGF) USP without enzymes, (2) a pH 4.5 buffer, (3) a pH 6.8 buffer or Simulated Intestinal Fluid USP without enzymes.

It should be understood that the dosage forms disclosed herein demonstrate a comparable release profile (to the release profile before an accelerated stability study) after a stability study performed at at least one temperature value within the range of about 25° C. to about 40° C. (e.g., at about 40° C.) and at at least one humidity value within the range of about 60% to about 75% (e.g., at about 75% humidity) and after at least one time point from time points T=1 month, T=2 months, and T=3 months. The dosage form may, but does not necessarily, demonstrate a comparable release profile (to the release profile before an accelerated stability study) after stability study performed at every single temperature, humidity, and time point value within the recited range. Thus, a dosage form that maintains a release profile after an accelerated stability study at, e.g., 30° C., at 70% humidity, and at T=1 month that is comparable to its release profile before the stability study, would meet the recited feature even if that same dosage form does not maintain a comparable release profile after an accelerated stability study at, e.g., 35° C., at a 75% humidity, and at T=3 months. Similarly, a dosage form exhibits a similarity factor (f2) greater than 50 after an accelerated stability study at, e.g., 40° C., at 75% humidity, and at T=1 month, would meet the recited feature even if that same dosage form does not exhibit a similarity factor (f2) greater than 50 after an accelerated stability study at, e.g., 40° C., at a 75% humidity, and at T=2 months.

Methods of Preparation, Stabilization, and Treatment

In some embodiments, the present invention is directed to a method for stabilizing a release profile of a dosage form. The method may comprise incorporating a surfactant and at least one of a solid or a semisolid lipid into a dosage form comprising an active pharmaceutical ingredient and curing the dosage form. The surfactant may have an HLB value of less than 10. The release profile of an active pharmaceutical ingredient from a dosage form stabilized according to this method after an accelerated stability study may be comparable to its release profile before an accelerated stability study.

Incorporating a surfactant with the at least one of the solid or semisolid lipid may comprise forming a homogenous mixture. The homogenous mixture may form a matrix.

Curing the dosage form may be performed at a temperature ranging from about 10° C. to about 100° C., from about 20° C. to about 80° C., or from about 30° C. to about 60° C.

The duration of curing may range from about 1 hour to about 14 days, from about 2 hours to about 10 days, or from about 3 hours to about 7 days. In an embodiment, the curing of the dosage form may be performed at a temperature of 50° C. for about 7 days.

In some embodiments, the method for stabilizing the release profile of the active pharmaceutical ingredient from the dosage form may further comprise dissolving or suspending an active pharmaceutical ingredient in the homogenous mixture or in the matrix.

In certain embodiments, the method for stabilizing the release profile of the active pharmaceutical ingredient from the dosage form may further comprise dosing the dissolved or suspended active pharmaceutical ingredient in the homogenous mixture or in the matrix into preformed cavities using a rotary die machine. The dosed blister cavities may then be cooled and sealed. This approach may eliminate the need for fillers, thereby maximizing the amount of solubility and/or bioavailability enhancing materials used.

In other embodiments, the method for stabilizing the release profile of the active pharmaceutical ingredient from the dosage form may further comprise filling the dissolved or suspended active pharmaceutical ingredient within the homogenous mixture or within the matrix into a softshell capsule or into a hardshell capsule (e.g., a soft-gelatine capsule or a starch- or a carrageenan-based capsule).

In yet other embodiments, the method for stabilizing the release profile of the active pharmaceutical ingredient from the dosage form may further comprise solidifying the dissolved or suspended active pharmaceutical ingredient within the homogenous mixture or within the matrix and compressing the solidified active pharmaceutical ingredient within the homogenous mixture or within the matrix into a tablet. Solidifying the dissolved or suspended active pharmaceutical ingredient within the homogenous mixture or within the matrix may comprise drying in drying tunnels, freeze-drying, or cooling the dissolved or suspended active pharmaceutical ingredient within the homogenous mixture or within the matrix.

In further embodiments, the method for stabilizing the release profile of the active pharmaceutical ingredient from the dosage form may further comprise extruding the dissolved or suspended active pharmaceutical ingredient within the homogenous mixture or within the matrix.

In some embodiments, the present invention is directed to a method for preparing a dosage form. One exemplary method may comprise mixing an active pharmaceutical ingredient with a surfactant and with at least one solid or semisolid lipid to form a mixture. The method may further comprise heating the mixture to melt the at least one solid or semisolid lipid to form a molten mixture. The method may further comprise forming the molten mixture into a dosage form and curing the dosage form.

In one embodiment, forming the molten mixture into a dosage form may comprise dosing the molten mixture into a preformed blister cavity. In one embodiment, forming the molten mixture into a dosage form may comprise encapsulating the molten mixture in a hardshell capsule or a softshell capsule.

Another exemplary method may comprise mixing an active pharmaceutical ingredient with a surfactant with an HLB value of less than 10 and with at least one solid or semisolid lipid in an extruder. The method may further comprise extruding the active pharmaceutical ingredient, the surfactant, and the at least one solid or semisolid lipid to form a dosage form. The method may further comprise curing the dosage form.

Yet another exemplary method may comprise solubilizing/dissolving an active pharmaceutical ingredient, a surfactant with an HLB value of less than 10, and the at least one of a solid or a semisolid lipid in a solvent. The method may further comprise spray drying or spray congealing the solubilized/dissolved active pharmaceutical ingredient, the surfactant, and the at least one of a solid or a semisolid lipid to form a powder. The method may further comprise curing the powder.

The release profile of an active pharmaceutical ingredient from a dosage form prepared according to these methods after an accelerated stability study may be comparable to its release profile before an accelerated stability study.

Curing the dosage form in the various methods of preparation described herein may be performed at a temperature ranging from about 10° C. to about 100° C., from about 20° C. to about 80° C., or from about 30° C. to about 60° C. The duration of curing may range from about 1 hour to about 14 days, from about 2 hours to about 10 days, or from about 3 hours to about 7 days. In an embodiment, the curing of the dosage form may be performed at a temperature of 50° C. for about 7 days.

Any of the active pharmaceutical ingredients, surfactants, solid or semisolid lipids, solvents, and other fillers and/or excipients disclosed herein may be incorporated into the dosage form at various steps in any of the methods disclosed herein (e.g., the various additional components may be mixed, dissolved, suspended, heated, cooled, cured, extruded, solidified, dried, etc with the solid or semisolid lipid, the surfactant with HLB value of less than 10, and the active pharmaceutical ingredient).

In some embodiments, the present invention is directed to a method of treatment comprising administering to a patient in need thereof a therapeutically effective amount of any of the dosage forms disclosed herein.

ILLUSTRATIVE EXAMPLES

The following examples are set forth to assist in understanding the disclosure and should not be construed as specifically limiting the disclosure described and claimed herein. Such variations of the disclosure, including the substitution of all equivalents now known or later developed, which would be within the purview of those skilled in the art, and changes in formulation or minor changes in experimental design, are to be considered to fall within the scope of the disclosure incorporated herein.

Example 1

Figure 1B:
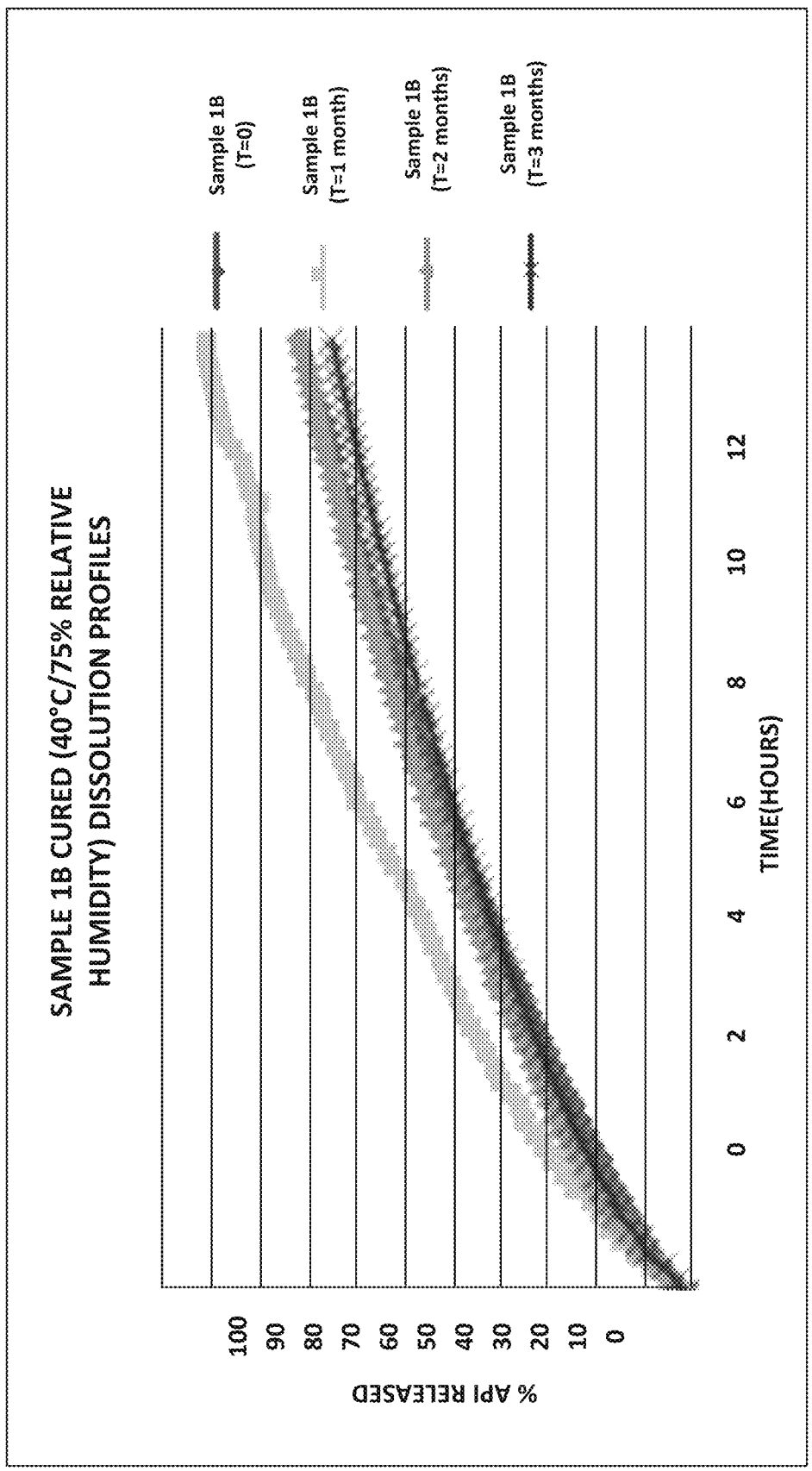
FIG. 1B depicts the dissolution profile of a cured comparative formulation subjected to an accelerated stability study.
Figure 2A:
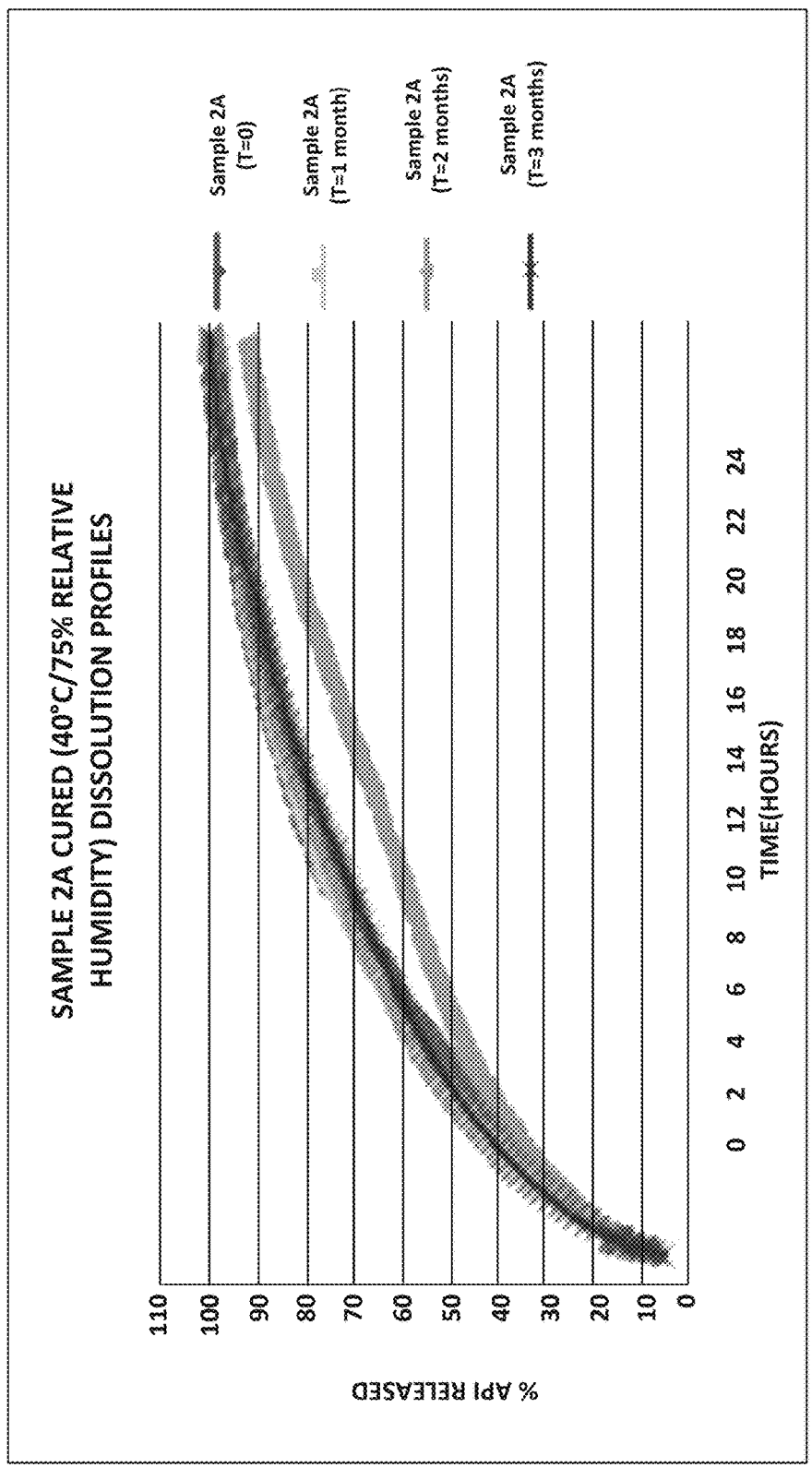
FIG. 2A depicts the dissolution profile of an uncured formulation, according to an embodiment, subjected to an accelerated stability study.
Figure 2B:
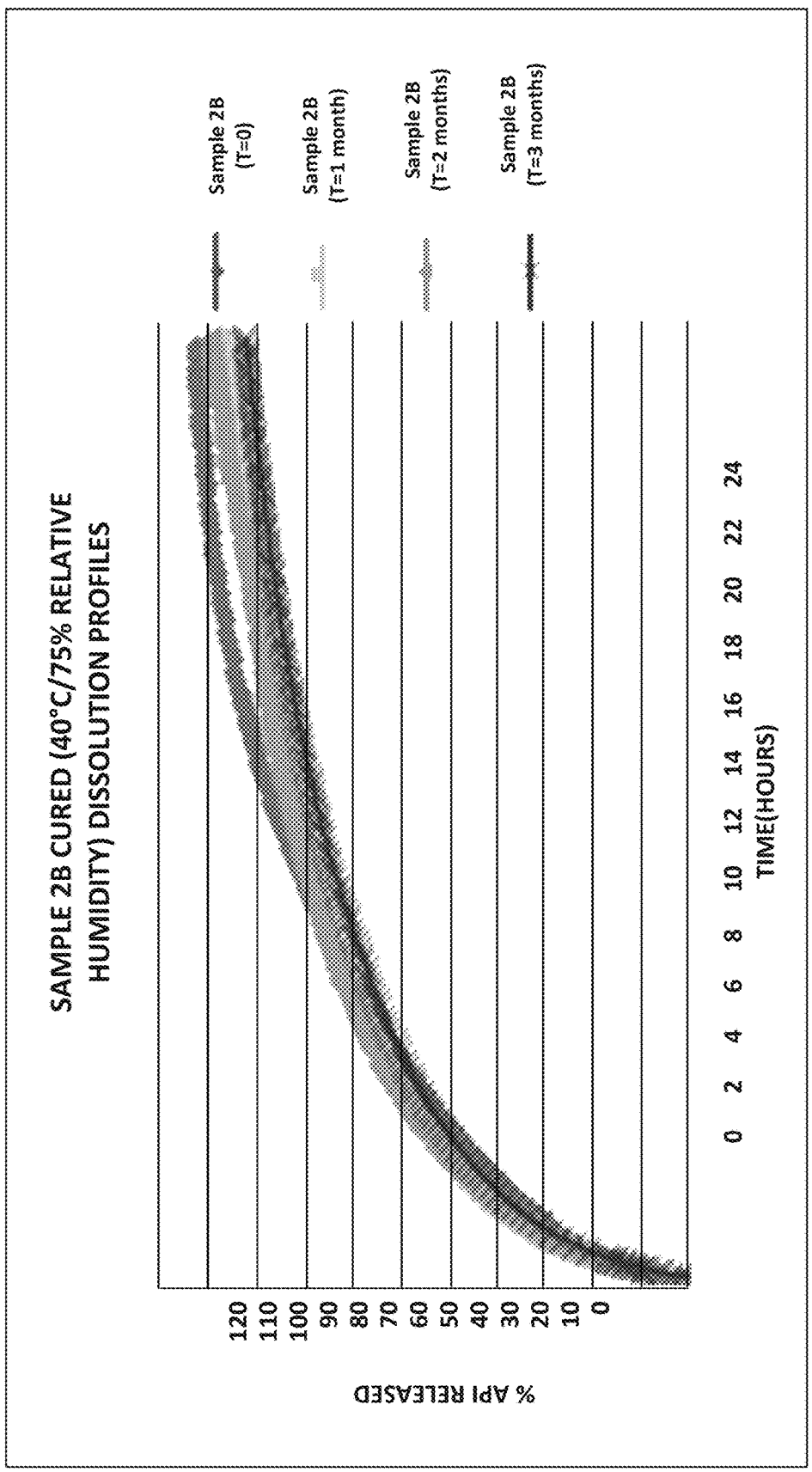
FIG. 2B depicts the dissolution profile of a cured formulation, according to an embodiment, subjected to an accelerated stability study.
Figure 3A:
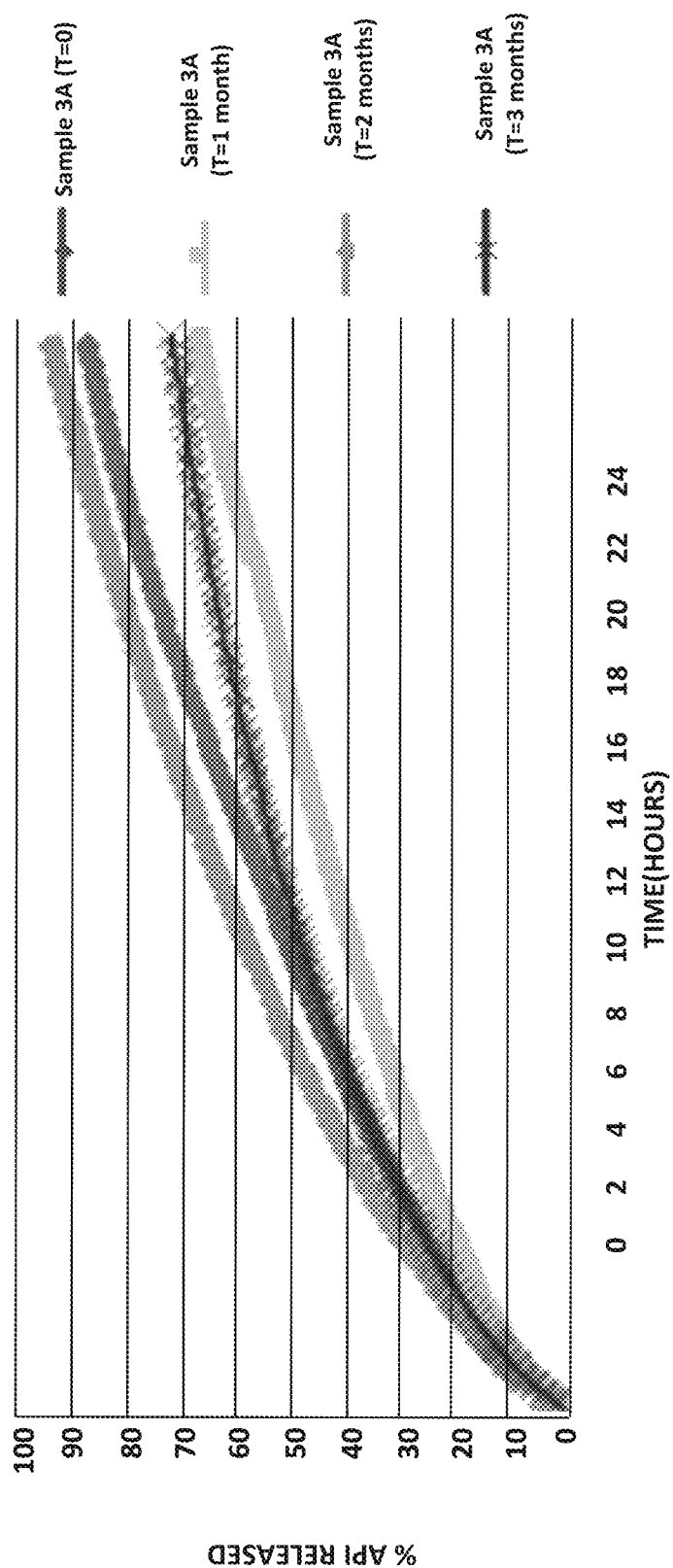
FIG. 3A depicts the dissolution profile of an uncured formulation, according to an embodiment, subjected to an accelerated stability study.
Figure 3B:
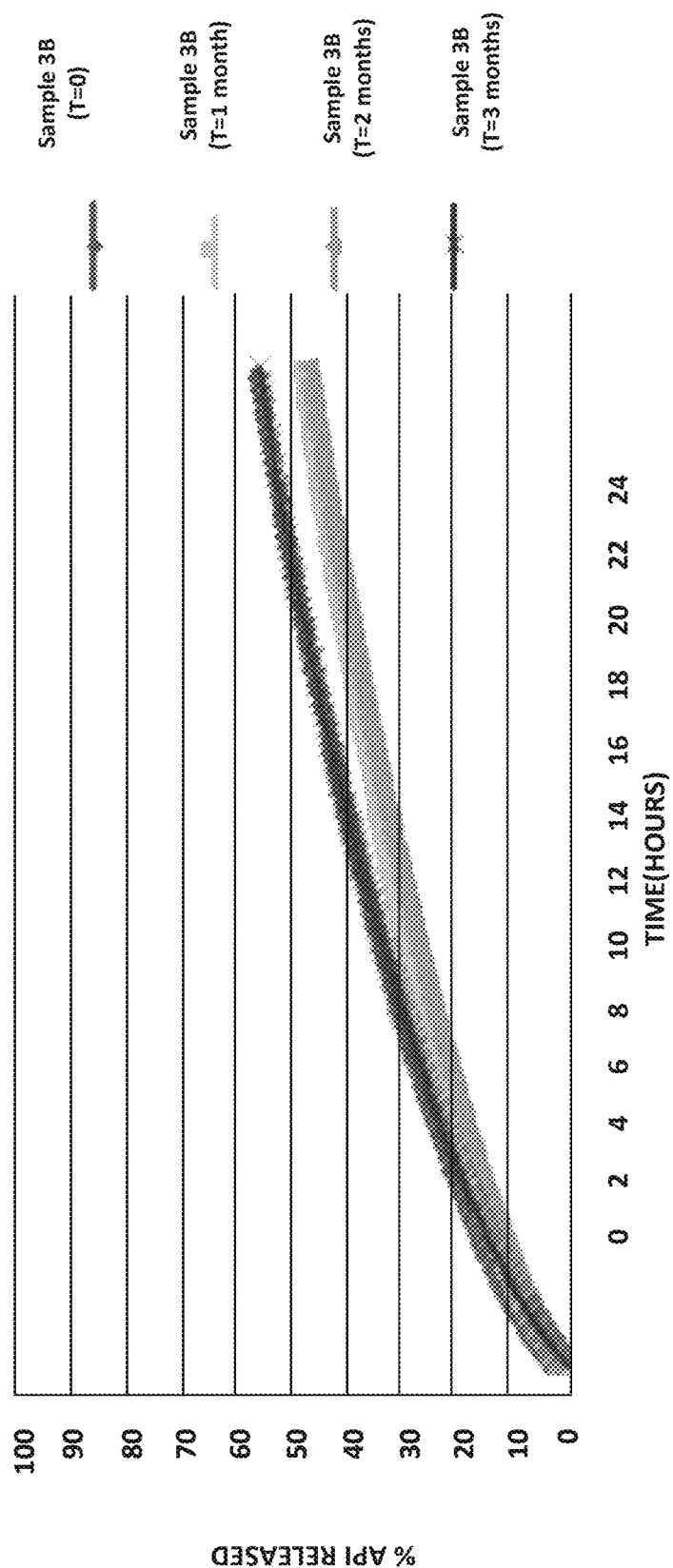
FIG. 3B depicts the dissolution profile of a cured formulation, according to an embodiment, subjected to an accelerated stability study.

The dissolution/release profile of three formulations (summarized in Table 1 below) are depicted in FIGS. 1A, 1B, 2A, 2B, 3A, and 3B. FIGS. 1A, 2A, and 3A depict the dissolution/release profile of uncured formulations. FIGS. 1B, 2B, and 3B depict the dissolution/release profile of cured formulations. The formulations of FIGS. 1B, 2B, and 3B were cured at a temperature of about 50° C. for about 7 days. The dissolution profile of each formulation (cured and uncured) was tested at four time points during the accelerated stability study: 1) immediately after preparation (T=0), 2) after one month of storage (T=1 month), 3) after two months of storage (T=2 months), and 4) after three months of storage (T=3 months). The storage conditions of the accelerated stability study were 40° C. and 75% relative humidity. All samples were evaluated in triplicates.

TABLE 1

Formulations Summary

|  | Function | Sample 1A (Uncured) & Sample 1B (cured) | Sample 2A (Uncured) & Sample 2B (cured) | Sample 3A (Uncured) & Sample 3B (Cured) |
|---|---|---|---|---|
| Caprylocaproyl polyoxyl-8 glycerides | Non-ionic water dispersible surfactant/ solubilizer | 30 w/w % | — | 20 w/w % |
| Glyceryl distearate | Lipid matrix for extended release | 45 w/w % | 10 w/w % | 45 w/w % |
| polyethylene glycol monostearate | Non-ionic water dispersible surfactant/ solubilizer | — | 55 w/w % | — |
| Sorbitan monostearate | Low HLB surfactant | — | 10 w/w % | 10 w/w % |
| Acetaminophen | Active pharmaceutical ingredient | 25 w/w % | 25 w/w % | 25 w/w % |

FIG. 1A depicts the dissolution/release profile of uncured Sample 1A over 12 hours, tested at T=0, T=1 month, T=2 months, and T=3 months. Each sample was evaluated in triplicates. The averaged numerical values are summarized in Table 2 below.

TABLE 2

Sample 1A Uncured

| Time (hours) | T = 0 % API Released | T = 1 month % API Released | T = 2 months % API Released | T = 3 months % API Released |
|---|---|---|---|---|
| 0 | 0.7177 | −0.2775 | −3.3362 | −0.8461 |
| 30 | 9.7829 | 9.9446 | 10.3479 | 7.9582 |
| 60 | 15.1469 | 20.2993 | 21.2360 | 14.1973 |
| 120 | 23.9885 | 43.4703 | 42.3757 | 24.8543 |
| 150 | 28.0290 | 52.6619 | 51.8968 | 29.9244 |
| 180 | 31.7790 | 60.2128 | 60.4240 | 35.9146 |
| 210 | 35.7342 | 66.9556 | 68.2366 | 40.4056 |
| 240 | 39.9726 | 75.7525 | 76.6862 | 44.9129 |
| 270 | 44.0579 | 84.7167 | 84.1851 | 49.0879 |
| 300 | 48.0196 | 91.6549 | 91.0536 | 53.2342 |
| 330 | 51.7357 | 96.6436 | 94.7356 | 57.2340 |
| 360 | 55.8591 | 99.3410 | 100.3505 | 61.5327 |
| 375 | 57.8752 | 100.0963 | 101.3215 | 63.2950 |
| 420 | 65.7513 | 102.9264 | 104.9437 | 69.3258 |
| 450 | 72.4269 | 103.8718 | 106.4658 | 72.7830 |
| 480 | 82.1416 | 103.9400 | 107.3015 | 76.4571 |
| 510 | 89.7145 | 104.4924 | 108.0903 | 80.8960 |
| 540 | 96.7083 | 104.4126 | 108.5188 | 85.7389 |
| 570 | 101.3579 | 104.5505 | 108.8533 | 98.2156 |
| 600 | 103.4120 | 104.5820 | 109.2629 | 102.4643 |
| 660 | 104.7596 | 104.3206 | 109.3843 | 108.6344 |
| 720 | 105.0351 | 104.3879 | 109.2774 | 111.5776 |

FIG. 1B depicts the dissolution/release profile of cured Sample 1B over 12 hours, tested at T=0, T=1 month, T=2 months, and T=3 months. Each sample was evaluated in triplicates. The averaged numerical values are summarized in Table 3 below.

TABLE 3

Sample 1B Cured

| Time (hours) | T = 0 % API Released | T = 1 month % API Released | T = 2 months % API Released | T = 3 months % API Released |
|---|---|---|---|---|
| 0 | −0.3369 | −1.5666 | −0.9081 | −0.3369 |
| 30 | 9.2047 | 10.7921 | 11.1492 | 9.2047 |
| 60 | 13.8437 | 18.4264 | 17.2328 | 13.8437 |
| 120 | 21.4863 | 29.9921 | 26.0494 | 21.4863 |
| 150 | 25.0108 | 34.5342 | 29.6538 | 25.0108 |
| 180 | 28.4535 | 38.8397 | 32.9692 | 28.4535 |
| 210 | 31.7202 | 42.6213 | 36.0571 | 31.7202 |
| 240 | 34.9273 | 46.1745 | 39.5997 | 34.9273 |
| 270 | 38.1016 | 49.3989 | 41.9430 | 38.1016 |
| 300 | 40.8347 | 52.4979 | 44.4505 | 40.8347 |
| 330 | 43.7217 | 56.3932 | 47.3237 | 43.7217 |
| 360 | 46.5432 | 60.5540 | 50.2931 | 46.5432 |
| 375 | 47.4758 | 61.6602 | 50.1127 | 47.4758 |
| 420 | 51.8884 | 66.8590 | 54.7888 | 51.8884 |
| 450 | 54.3841 | 69.5606 | 57.0688 | 54.3841 |
| 480 | 56.7620 | 72.7361 | 59.3102 | 56.7620 |
| 510 | 59.1285 | 75.8903 | 61.4698 | 59.1285 |
| 540 | 61.2732 | 78.3388 | 63.4705 | 61.2732 |
| 570 | 63.4111 | 80.0188 | 65.4147 | 63.4111 |
| 600 | 65.3453 | 80.1155 | 67.3376 | 65.3453 |
| 660 | 69.0058 | 86.8234 | 70.8911 | 69.0058 |
| 720 | 73.5278 | 89.7450 | 74.0413 | 73.5278 |

FIG. 2A depicts the dissolution/release profile of uncured Sample 2A over 24 hours, tested at T=0, T=1 month, T=2 months, and T=3 months. Each sample was evaluated in triplicates. The averaged numerical values are summarized in Table 4 below.

TABLE 4

Sample 2A Uncured

| Time (hours) | T = 0 % API Released | T = 1 month % API Released | T = 2 months % API Released | T = 3 months % API Released |
|---|---|---|---|---|
| 0 | −0.3069 | −0.3679 | −0.3492 | −2.4271 |
| 1 | 18.8591 | 19.8497 | 17.1222 | 20.2608 |
| 2 | 28.8489 | 31.1439 | 26.0091 | 30.5319 |
| 3 | 34.7842 | 39.6389 | 32.6482 | 38.3630 |
| 4 | 40.8885 | 46.5522 | 38.0649 | 44.8454 |
| 5 | 47.0585 | 52.5228 | 42.6969 | 50.4537 |
| 6 | 53.3124 | 57.8028 | 46.6773 | 55.3972 |
| 7 | 59.6165 | 62.4938 | 50.1881 | 59.9694 |
| 8 | 66.3600 | 66.8798 | 53.3334 | 64.1287 |
| 9 | 72.6844 | 70.7342 | 56.2548 | 68.0665 |
| 10 | 76.7313 | 74.2168 | 59.0190 | 71.4978 |
| 11 | 79.9411 | 77.2682 | 62.1190 | 74.9427 |
| 12 | 82.8726 | 80.2988 | 65.3004 | 78.1970 |
| 13 | 84.9382 | 82.9110 | 68.5609 | 81.3610 |
| 14 | 88.6641 | 86.1824 | 72.7258 | 85.0306 |
| 15 | 90.5393 | 88.3449 | 75.5070 | 87.5209 |
| 16 | 92.1850 | 90.3059 | 78.0291 | 89.5447 |
| 17 | 94.1397 | 91.9317 | 80.8947 | 91.5410 |
| 18 | 95.5139 | 93.4544 | 83.4395 | 93.9073 |
| 19 | 96.3510 | 94.8128 | 85.4425 | 95.9321 |
| 20 | 97.2941 | 96.0568 | 87.6546 | 97.3829 |
| 21 | 97.9538 | 97.1574 | 89.3137 | 98.6499 |
| 22 | 98.3182 | 97.6276 | 90.8879 | 99.4952 |
| 23 | 98.8773 | 98.5599 | 92.2897 | 100.6380 |
| 24 | 99.0326 | 99.5414 | 93.1273 | 101.2612 |

FIG. 2B depicts the dissolution/release profile of cured Sample 2B over 24 hours, tested at T=0, T=1 month, T=2 months, and T=3 months. Each sample was evaluated in triplicates. The averaged numerical values are summarized in Table 5 below.

TABLE 5

Sample 2B Cured

| Time (hours) | T = 0 % API Released | T = 1 month % API Released | T = 2 months % API Released | T = 3 months % API Released |
|---|---|---|---|---|
| 0 | 1.8967 | −0.5081 | 0.3888 | −1.4102 |
| 1 | 27.0055 | 30.5650 | 31.8496 | 28.1964 |
| 2 | 37.9868 | 43.0656 | 44.4535 | 40.6087 |
| 3 | 46.5163 | 50.9476 | 53.2489 | 48.8300 |
| 4 | 53.7979 | 58.8969 | 60.1505 | 55.0469 |
| 5 | 60.1262 | 64.3684 | 65.8966 | 60.3081 |
| 6 | 65.8182 | 68.9087 | 70.8655 | 64.5786 |
| 7 | 71.0231 | 72.9265 | 74.5800 | 68.3854 |
| 8 | 75.8241 | 76.2842 | 78.1271 | 71.8019 |
| 9 | 80.2436 | 79.3073 | 81.0745 | 74.8340 |
| 10 | 84.3421 | 81.9757 | 83.2683 | 77.4714 |
| 11 | 87.8966 | 84.2873 | 85.7209 | 79.9011 |
| 12 | 91.0517 | 86.3350 | 87.7096 | 82.0626 |
| 13 | 94.0727 | 88.1965 | 90.0054 | 84.0902 |
| 14 | 97.3603 | 90.1192 | 92.3609 | 86.5283 |
| 15 | 99.3700 | 91.5466 | 93.6773 | 88.0414 |
| 16 | 101.2103 | 92.8651 | 95.1133 | 89.5684 |
| 17 | 102.7997 | 94.0665 | 96.5772 | 90.8437 |
| 18 | 104.0940 | 95.1637 | 97.8068 | 92.1748 |
| 19 | 105.2679 | 95.9852 | 99.5992 | 93.3561 |
| 20 | 106.0900 | 97.2495 | 101.0080 | 94.2816 |
| 21 | 106.9921 | 98.0713 | 102.2153 | 95.2003 |
| 22 | 107.8282 | 98.8892 | 103.3792 | 96.3435 |
| 23 | 108.3921 | 99.6720 | 104.6413 | 97.2337 |
| 24 | 108.7660 | 100.3064 | 105.3900 | 97.6465 |

FIG. 3A depicts the dissolution/release profile of uncured Sample 3A over 24 hours, tested at T=0, T=1 month, T=2 months, and T=3 months. Each sample was evaluated in triplicates. The averaged numerical values are summarized in Table 6 below.

TABLE 6

Sample 3A Uncured

| Time (hours) | T = 0 % API Released | T = 1 month % API Released | T = 2 months % API Released | T = 3 months % API Released |
|---|---|---|---|---|
| 0 | −1.7279 | −1.1294 | −1.5557 | −1.8819 |
| 1 | 9.1639 | 6.7655 | 11.1204 | 8.9651 |
| 2 | 15.5529 | 11.9097 | 18.9095 | 15.7764 |
| 3 | 20.9368 | 16.1016 | 25.4474 | 21.2228 |
| 4 | 25.7843 | 19.8232 | 31.3212 | 25.8728 |
| 5 | 30.1385 | 23.2196 | 36.4783 | 30.1168 |
| 6 | 34.2958 | 26.2887 | 41.2382 | 33.8716 |
| 7 | 38.2777 | 29.2279 | 45.6690 | 37.4609 |
| 8 | 42.0463 | 32.0056 | 49.8652 | 40.8827 |
| 9 | 45.7329 | 34.6794 | 53.8367 | 43.9100 |
| 10 | 49.3468 | 37.2270 | 57.5605 | 46.7757 |
| 11 | 52.8164 | 39.6440 | 61.0824 | 49.4439 |
| 12 | 56.2299 | 41.9755 | 64.4759 | 51.9624 |
| 13 | 59.5503 | 44.2100 | 67.8617 | 54.1958 |
| 14 | 62.8682 | 46.3467 | 70.8983 | 56.5211 |
| 15 | 66.0646 | 48.4249 | 73.8361 | 58.4972 |
| 16 | 69.1592 | 50.4087 | 76.6748 | 60.3713 |
| 17 | 72.1714 | 52.3199 | 79.3599 | 62.5202 |
| 18 | 74.9780 | 54.1783 | 82.0014 | 64.1224 |
| 19 | 77.6212 | 56.3268 | 84.4600 | 65.6152 |
| 20 | 80.1234 | 59.3911 | 86.9037 | 67.0474 |
| 21 | 82.4358 | 61.5538 | 89.1148 | 68.5034 |
| 22 | 84.6193 | 63.5987 | 91.3970 | 70.0018 |
| 23 | 86.6312 | 65.4621 | 93.6217 | 71.3014 |
| 24 | 88.4570 | 67.2231 | 95.6351 | 72.4307 |

FIG. 3B depicts the dissolution/release profile of cured Sample 3B over 24 hours, tested at T=0, T=1 month, T=2 months, and T=3 months. Each sample was evaluated in triplicates. The averaged numerical values are summarized in Table 7 below.

TABLE 7

Sample 3B Cured

| Time (hours) | T = 0 % API Released | T = 1 month % API Released | T = 2 months % API Released | T = 3 months % API Released |
|---|---|---|---|---|
| 0 | 1.3848 | −0.6321 | −1.0943 | −1.4966 |
| 1 | 7.5809 | 4.8413 | 4.1464 | 4.8258 |
| 2 | 11.9253 | 8.8234 | 7.9355 | 9.6205 |
| 3 | 15.4872 | 11.8975 | 11.0884 | 13.5661 |
| 4 | 18.6128 | 15.2779 | 13.8193 | 17.0945 |
| 5 | 21.4518 | 17.8362 | 16.3556 | 20.2457 |
| 6 | 24.0269 | 20.2424 | 18.5973 | 23.1479 |
| 7 | 26.5036 | 22.5118 | 20.7587 | 25.8840 |
| 8 | 28.8790 | 24.6480 | 22.8915 | 28.4024 |
| 9 | 31.0854 | 26.6283 | 24.7737 | 30.8152 |
| 10 | 33.2789 | 28.5875 | 26.6689 | 33.0806 |
| 11 | 35.3753 | 30.3075 | 28.4531 | 35.2772 |
| 12 | 37.3681 | 31.9739 | 30.2217 | 37.3637 |
| 13 | 39.3462 | 33.5903 | 31.8676 | 39.2911 |
| 14 | 41.2015 | 35.0671 | 33.5166 | 41.1702 |
| 15 | 42.9509 | 36.7680 | 34.9929 | 43.0371 |
| 16 | 44.6932 | 38.2068 | 36.4530 | 44.6270 |
| 17 | 46.3426 | 39.6737 | 37.9854 | 46.1673 |
| 18 | 48.0617 | 40.9453 | 39.3794 | 47.9686 |
| 19 | 49.5422 | 42.2158 | 40.7386 | 49.4405 |
| 20 | 51.1765 | 43.4917 | 42.0956 | 50.8117 |
| 21 | 52.6087 | 44.7072 | 43.3757 | 52.1906 |
| 22 | 54.0623 | 45.9654 | 44.5994 | 53.8634 |
| 23 | 55.4486 | 46.9631 | 45.7515 | 54.8963 |
| 24 | 56.8066 | 47.8915 | 46.7938 | 56.1283 |

The similarity factors of: a) T=1 month as compared to T=0, b) T=2 months as compared to T=0, and c) T=3 months as compared to T=0 for each of the samples (sample 1A, sample 1B, sample 2A, sample 2B, sample 3A, and sample 3B) are summarized in Table 8 below.

TABLE 8

Similarity Factor (f2) %

| Sample Name | T = 1 month | T = 2 months | T = 3 months |
|---|---|---|---|
| Sample 1A Uncured | 28.14 | 27.60 | 65.00 |
| Sample 1B Cured | 44.24 | 73.74 | 77.76 |
| Sample 2A Uncured | 77.29 | 47.08 | 75.41 |
| Sample 2B Cured | 59.59 | 65.71 | 53.19 |
| Sample 3A Uncured | 41.05 | 57.97 | 54.21 |
| Sample 3B Cured | 61.50 | 56.86 | 91.18 |

As seen in Table 8, comparative uncured sample 1A depicts variation in its API release profile after the accelerated stability study (at 40° C. and 75% relative humidity) at T=1 month and at T=2 months, as evidenced by a similarity factor (f2) that is less than 50. Upon exposure to the conditions of the accelerated stability study (at 40° C. and 75% relative humidity) for three months (T=3 months), the sample undergoes un-intentional curing, which is believed to lead to the improvement in similarity factor (f2 of about 65).

Comparative sample 1B depicts that curing improves the stability of the API release profile from a dosage form over time, as evidenced by the higher f2 value of 44.24 at T=1 month of cured sample 1B as compared to the f2 value of 28.14 at T=1 month of uncured sample 1B. Further improvement in f2 value for cured sample 1B is seen at T=2 months and T=3 months since it is believed that the sample undergoes additional un-intentional curing. Nevertheless, without being construed as limiting, curing by itself is believed to be insufficient to provide a similarity factor, f2, that is equal to or greater than 50 at all time points of the accelerated stability study (T=1 month, 2 months, and 3 months).

Samples 2A and 3A depict samples into which a low HLB surfactant was introduced, but were not cured. Without being construed as limiting, a low HLB surfactant by itself is believed to be insufficient to provide a similarity factor, f2, that is equal to or greater than 50 at all time points of the accelerated stability study (T=1 month, 2 months, and 3 months). This may be evidenced by the f2 value of 47.08 of sample 2A at time T=2 months and by the f2 value of 41.05 of sample 3A at time T=1 month.

In contrast, samples 2B and 3B, into which a low HLB surfactant was introduced and were subjected to curing, consistently depict a similarity factor, f2, equal to or greater than 50 at all time points of the accelerated stability study (T=1 month, 2 months, and 3 months).

As seen in the figures and in Tables, incorporating a low HLB surfactant into a formulation and subjecting the formulation to curing mitigates changes in the API release profile over time and stabilizes the dissolution/release profile of an active pharmaceutical ingredient from a dosage form over time. Without being construed as limiting, it is believed that curing by itself without introduction of a low HLB surfactant into the formulation may be insufficient and that introduction of the low HLB surfactant by itself without curing of the dosage form may also be insufficient.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

The present invention has been described with reference to specific exemplary embodiments thereof. The specification and drawings are, accordingly, to be regarded in an illustrative rather than a restrictive sense. Various modifications of the invention in addition to those shown and described herein will become apparent to those skilled in the art and are intended to fall within the scope of the appended claims.

What is claimed is:

1. A method for stabilizing an active pharmaceutical ingredient release profile of a dosage form, the method comprising:

incorporating a surfactant having an HLB value of less than about 10 and at least one of a solid or a semisolid lipid into the dosage form, wherein the incorporating comprises forming a homogenous mixture of the surfactant and the at least one of the solid or the semisolid lipid, wherein the homogenous mixture forms a matrix, subsequently dissolving or suspending an active pharmaceutical ingredient in the matrix; and subsequently curing the dosage form comprising the active pharmaceutical ingredient, wherein the curing is performed at a temperature from about 30° C. to about 60° C. for a duration of about 3 hours to about 7 days, wherein the release profile of the active pharmaceutical ingredient from the dosage form after an accelerated stability study has a similarity factor (f2) no less than 50 as compared to the release profile of the same active pharmaceutical ingredient from the dosage form before the accelerated stability study, wherein the accelerated stability study is performed at a temperature of about 40° C. and at a humidity of about 75% for a duration of 1 month.

2. The method of claim 1, wherein the surfactant is selected from the group consisting ethylene oxide/propylene oxide (EO/PO) copolymers, glycerol monocaprylate, glycerol monocaprate, glycerol caprylate/caprate, glycerol monooleate, glycerol monostearate, glycerol laurate, glycerol monolinoleate, glycerol behenate, glycerol palmitostearate, petrolatum and lanolin alcohols, polyoxyethylene alkyl ethers, sorbitan fatty acid esters, sucrose esters, poly(ethylene glycol)-block-poly(propylene glycol)-block-poly(ethylene glycol) copolymers, lecithin, phospholipids, steareth-2, oleth-2, ceteth-2, PEG-30 dipolyhydroxystearate, propylene glycol monocaprylate, propylene glycol dilaurate, propylene glycol monolaurate, propylene glycol monostearate, propylene glycol isostearate, alpha tocopherol, mixed tocopherols, tricaprylin, nonionic emulsifying waxes, anionic emulsifying waxes, sorbitan monooleate, sorbitan monostearate, sorbitan monopalmitate, sorbitan tristearate, sorbitan trioleate, and combinations thereof.

3. The method of claim 1, wherein the active pharmaceutical ingredient has a half-life of less than about 8 hours.

4. The method of claim 1, wherein the active pharmaceutical ingredient is selected from the group consisting of dabigatran, dronedarone, ticagrelor, iloperidone, ivacaftor, midostaurine, asimadoline, beclomethasone, apremilast, sapacitabine, linsitinib, abiraterone, vitamin D analogs, COX-2 inhibitors, tacrolimus, testosterone, lubiprostone, pharmaceutically acceptable salts thereof, and combinations thereof.

5. The method of claim 1, further comprising dosing the dissolved or suspended active pharmaceutical ingredient within the matrix into preformed blister cavities using a rotary die machine, cooling the dosed blister cavities, and sealing the blister cavities.

6. The method of claim 1, further comprising filling the dissolved or suspended active pharmaceutical ingredient within the matrix into a softshell capsule or into a hardshell capsule.

7. The method of claim 1, further comprising solidifying the dissolved or suspended active pharmaceutical ingredient within the matrix and compressing the solidified active pharmaceutical ingredient within the matrix into a tablet, wherein solidifying comprises drying in drying tunnels, freeze-drying, or cooling the dissolved or suspended active pharmaceutical ingredient within the matrix.

8. The method of claim 1, further comprising extruding the dissolved or suspended active pharmaceutical ingredient within the matrix.

9. The method of claim 1, wherein the dosage form has about 20 w/w % or less fillers, based on total weight of the dosage form.

10. The method of claim 1, wherein the dosage form further comprises excipients selected from the group consisting of high melting point fats, waxes, low melting point oils, surfactants with HLB values greater than 10, solvents, cosolvents, solid high molecular weight polyethylene glycol, liquid polyethylene glycol, lubricants, pore formers, dispersing agents, gelatin, gums, water-soluble polymers, water, glycerin, sorbitol, cyclodextrins, flavoring agents, disintegrants, and combinations thereof.

11. The method of claim 1, wherein the dosage form is suitable for administration via an oral route, sublingual route, buccal route, vaginal route, or rectal route.

12. The method of claim 1, wherein the dosage form demonstrates an extended release profile.

13. A dosage form prepared by the method of claim 1.

14. A method for stabilizing an active pharmaceutical ingredient release profile of a dosage form, the method comprising:
  incorporating a surfactant having an HLB value of less than about 10 and at least one of a solid or a semisolid lipid into the dosage form, wherein the incorporating comprises forming a homogenous mixture of the surfactant and the at least one of the solid or the semisolid lipid, wherein the homogenous mixture forms a matrix,
  subsequently dissolving or suspending an active pharmaceutical ingredient in the matrix; and
  subsequently curing the dosage form comprising the active pharmaceutical ingredient, wherein the curing is performed at a temperature from about 30° C. to about 60° C. for a duration of about 3 hours to about 7 days,
wherein the release profile of the active pharmaceutical ingredient from the dosage form after an accelerated stability study has a similarity factor (f2) no less than 50 as compared to the release profile of the same active pharmaceutical ingredient from the dosage form before the accelerated stability study, wherein the accelerated stability study is performed at a temperature of about 40° C. and at a humidity of about 75% for a duration of 1 month,
wherein the surfactant with an HLB value of less than 10 is selected from the group consisting of glycerol monocaprylate, glycerol monocaprate, glycerol caprylate/caprate, glycerol monooleate, glycerol monostearate, glycerol laurate, sorbitan fatty acid esters, sucrose esters, lecithin, phospholipids, propylene glycol dilaurate, propylene glycol monolaurate, propylene glycol monostearate, nonionic emulsifying waxes, anionic emulsifying waxes, sorbitan monooleate, sorbitan monostearate, sorbitan monopalmitate, sorbitan tristearate, sorbitan trioleate, and combinations thereof and the solid or the semisolid lipid is glyceryl distearate.

* * * * *